United States Patent [19]
Locke et al.

[11] Patent Number: 5,918,415
[45] Date of Patent: Jul. 6, 1999

[54] MULTI-PURPOSE SELF-WATERING SYSTEM

[76] Inventors: Randal D. Locke; Daniel P. Dunbar; Teresa M. Locke, all of P.O. Box 1325, Redway, Calif. 95560-1325

[21] Appl. No.: 08/488,289

[22] Filed: Jun. 7, 1995

[51] Int. Cl.⁶ .................................................. A01G 25/00
[52] U.S. Cl. .................................................. 47/79; 119/74
[58] Field of Search .................. 47/29, 65.5; 119/74, 119/78, 51.5, 61

[56] References Cited

U.S. PATENT DOCUMENTS

| | | | |
|---|---|---|---|
| 3,455,055 | 7/1969 | Chute | 47/71 |
| 3,733,746 | 5/1973 | Allen, Jr. | 47/38 |
| 3,758,987 | 9/1973 | Crane, Jr. | 47/38.1 |
| 3,759,228 | 9/1973 | Keen | 119/78 |
| 3,775,904 | 12/1973 | Peters | 47/38.1 |
| 3,783,555 | 1/1974 | Peters | 47/38 |
| 3,871,131 | 3/1975 | Berglund | 47/38.1 |
| 3,903,644 | 9/1975 | Swift et al. | 47/38 |
| 4,052,818 | 10/1977 | Hagerty | 47/81 |
| 4,065,095 | 12/1977 | Johnson | 251/118 |
| 4,083,147 | 4/1978 | Garrick | 47/80 |
| 4,100,699 | 7/1978 | Skaife | 47/81 S |
| 4,148,155 | 4/1979 | Allen | 47/59 |
| 4,180,096 | 12/1979 | Johnson | 137/403 |
| 4,183,175 | 1/1980 | Magee | 47/79 |
| 4,198,784 | 4/1980 | Sukert | 47/79 |
| 4,240,606 | 12/1980 | Johnson | 251/127 |
| 4,299,054 | 11/1981 | Ware | 47/81 S |
| 4,324,070 | 4/1982 | Swisher | 47/81 |
| 4,329,815 | 5/1982 | Secrest | 47/80 |
| 4,344,251 | 8/1982 | Edling | 47/80 |
| 4,356,665 | 11/1982 | de Oliveria | 47/80 |
| 4,369,598 | 1/1983 | Beckwith | 47/81 S |
| 4,510,712 | 4/1985 | Whitcomb | 47/66 |
| 4,527,354 | 7/1985 | Selier | 47/81 |
| 4,546,571 | 10/1985 | Scrivens | 47/81 |
| 4,557,071 | 12/1985 | Fah | 47/81 |
| 4,829,709 | 5/1989 | Centafanti | 47/81 S |
| 4,937,972 | 7/1990 | Freitus | 47/62 |
| 5,020,261 | 6/1991 | Lishman | 47/79 |
| 5,341,596 | 8/1994 | Kao | 47/79 |
| 5,377,621 | 1/1995 | Camm | 119/61 |
| 5,412,907 | 5/1995 | Anderson | 47/85 |
| 5,458,087 | 10/1995 | Prior et al. | 119/51.5 |
| 5,598,865 | 2/1997 | Musso | 137/315 |

FOREIGN PATENT DOCUMENTS

| | | | |
|---|---|---|---|
| 673076 | 2/1990 | Switzerland | 47/79 C |
| 2095083 | 9/1982 | United Kingdom | 47/79 C |

*Primary Examiner*—Michael J. Carone
*Assistant Examiner*—Joanne C. Downs
*Attorney, Agent, or Firm*—Millen, White, Zelano & Branigan, P.C.

[57] ABSTRACT

A multi-purpose automatic filing basin is provided for containing a selected amount of water which is used for various purposes. The water may be transferred from the basin by wicks or by a pump to water using devices such as plant pots or toys or may be provided for direct use from the basin for devices such as animal feeders and habitats. The basin is kept supplied with water from a pressurized source by a specialized valve which opens in response to a drop in water level below a first selected level and closes in response to the water level reaching as second selected level.

21 Claims, 32 Drawing Sheets

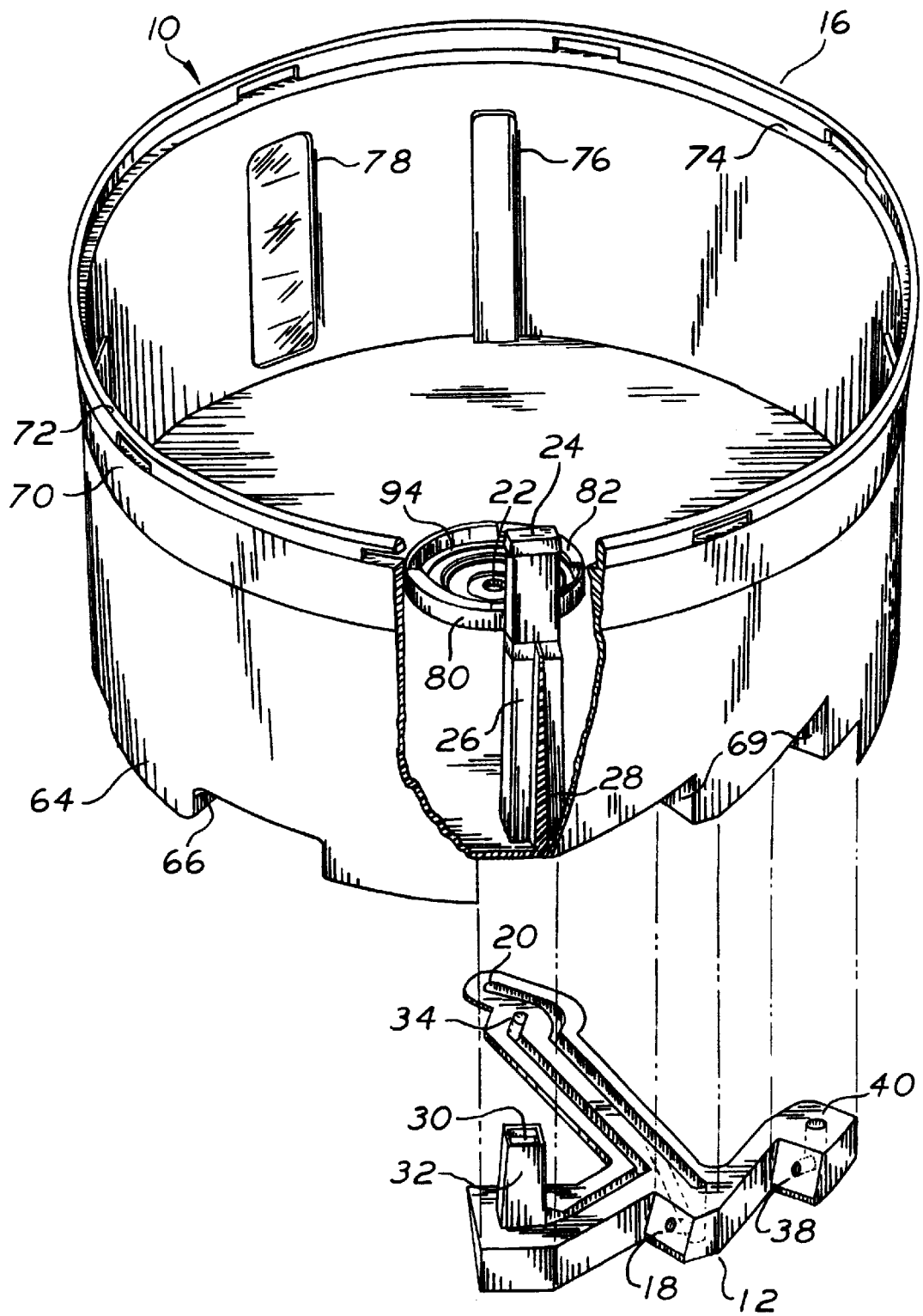

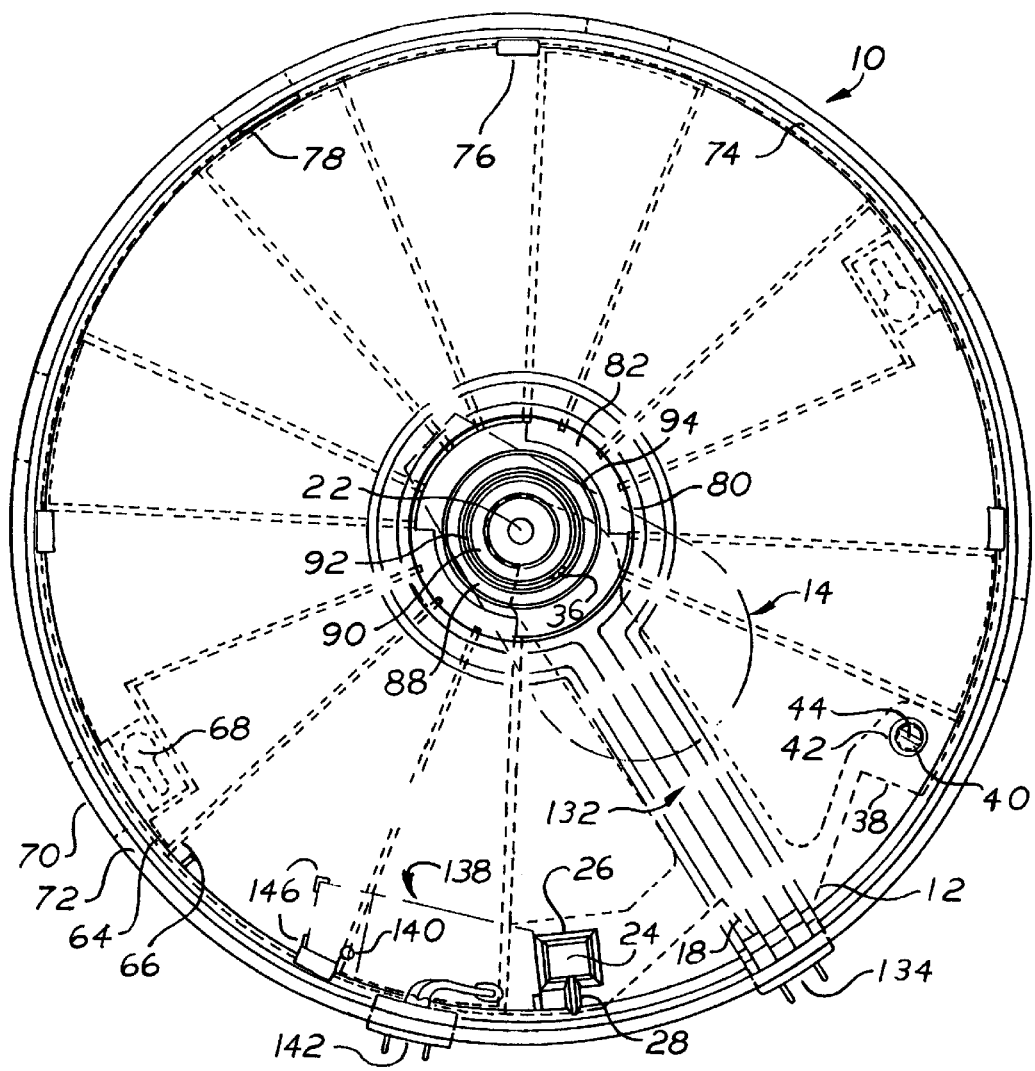
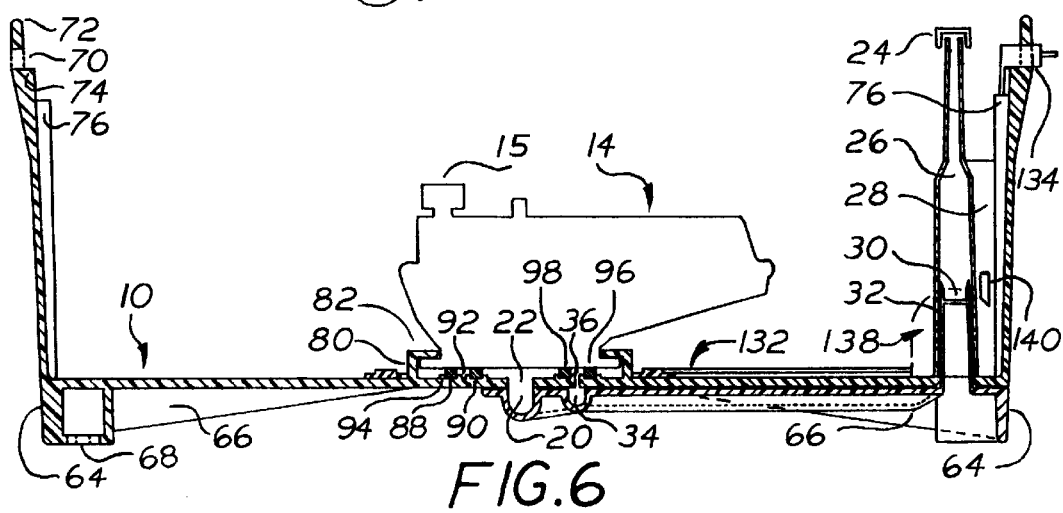

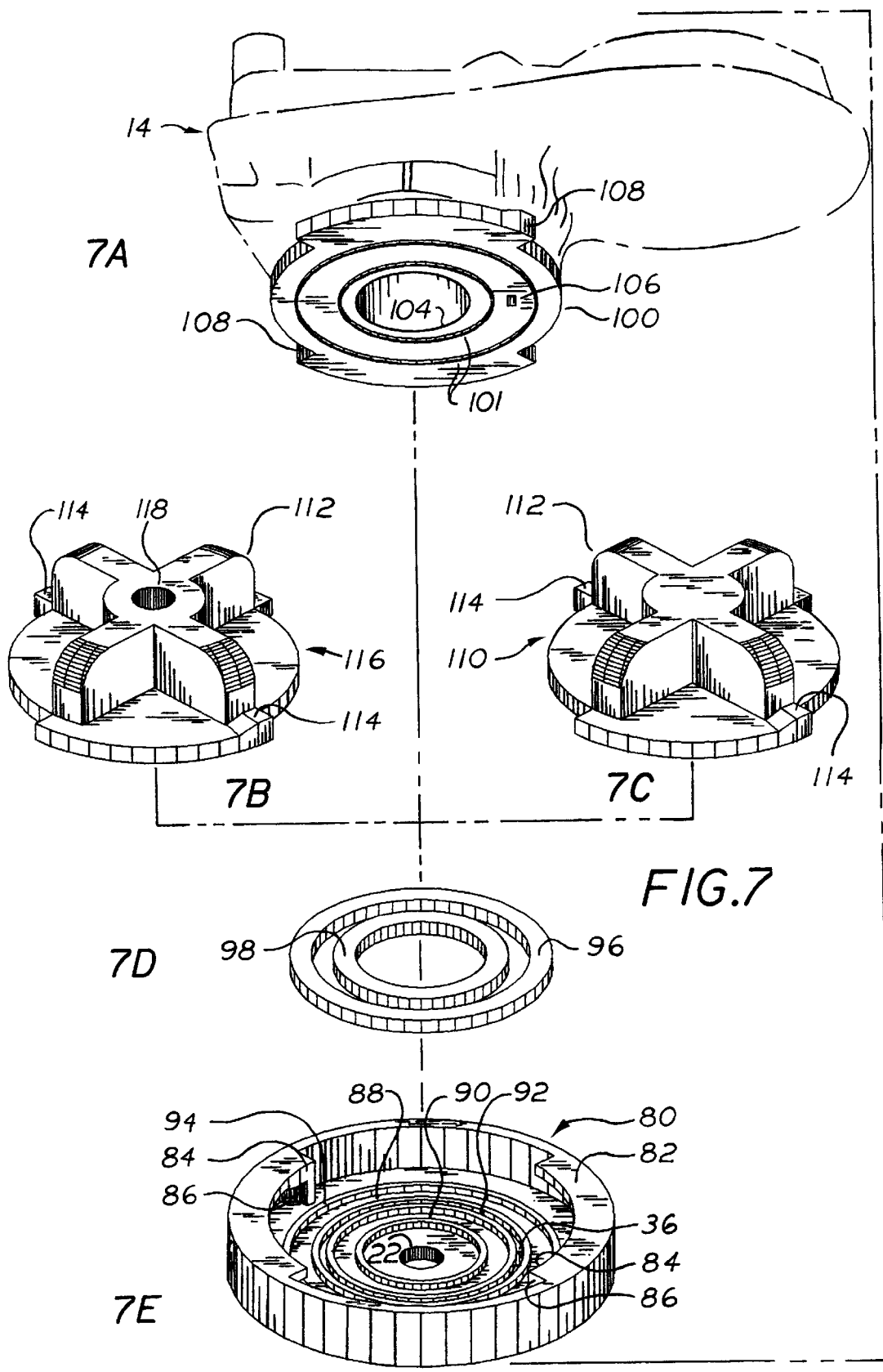

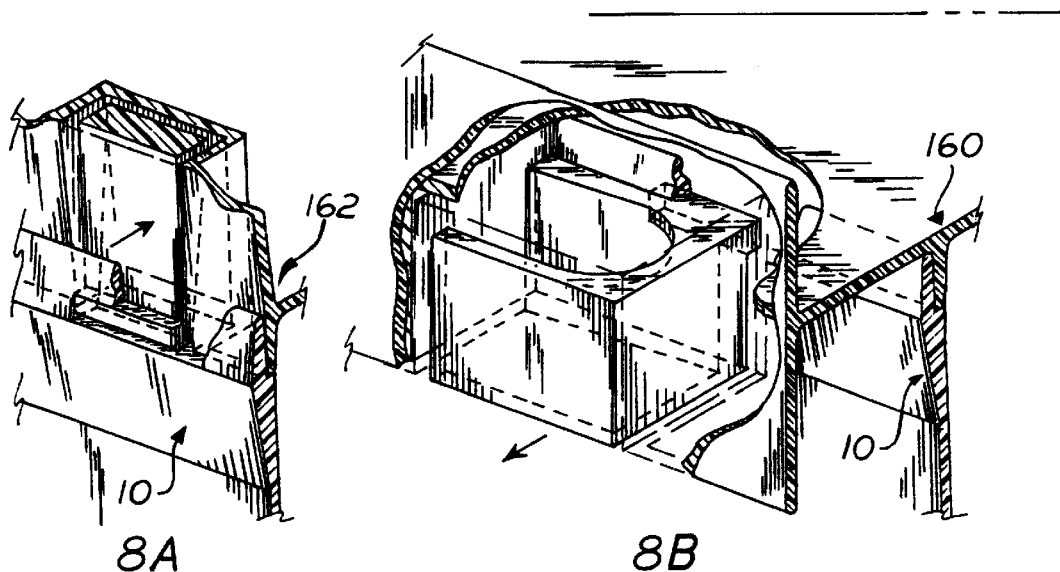
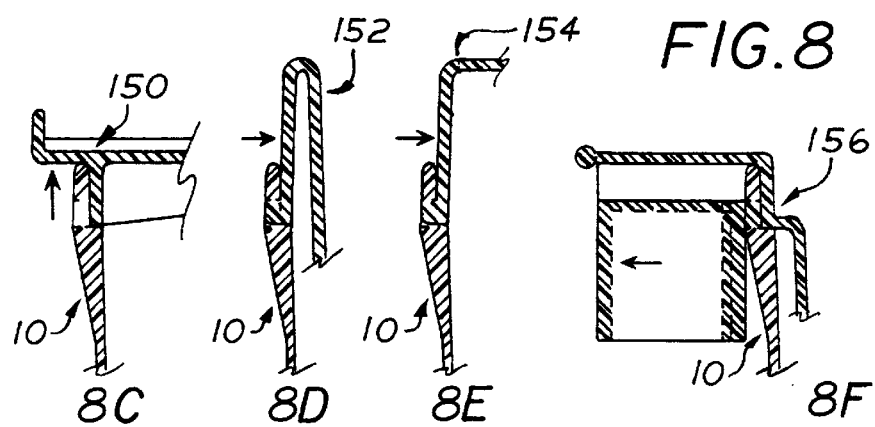
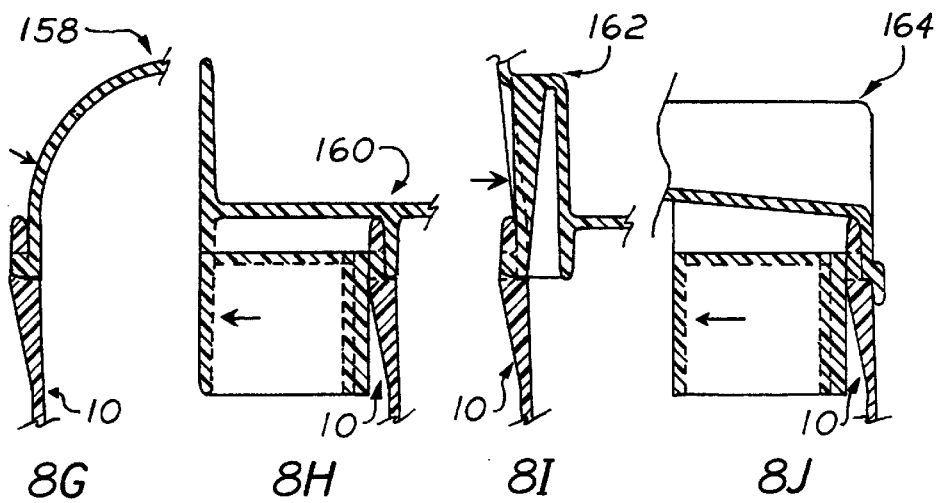
FIG. 8

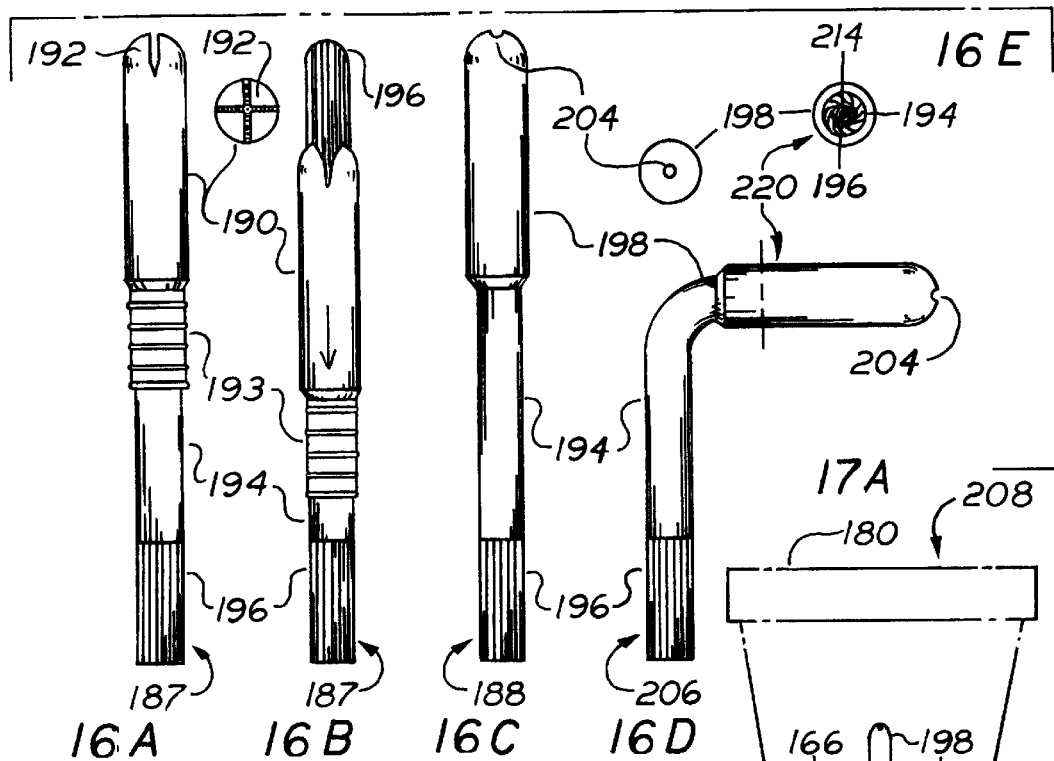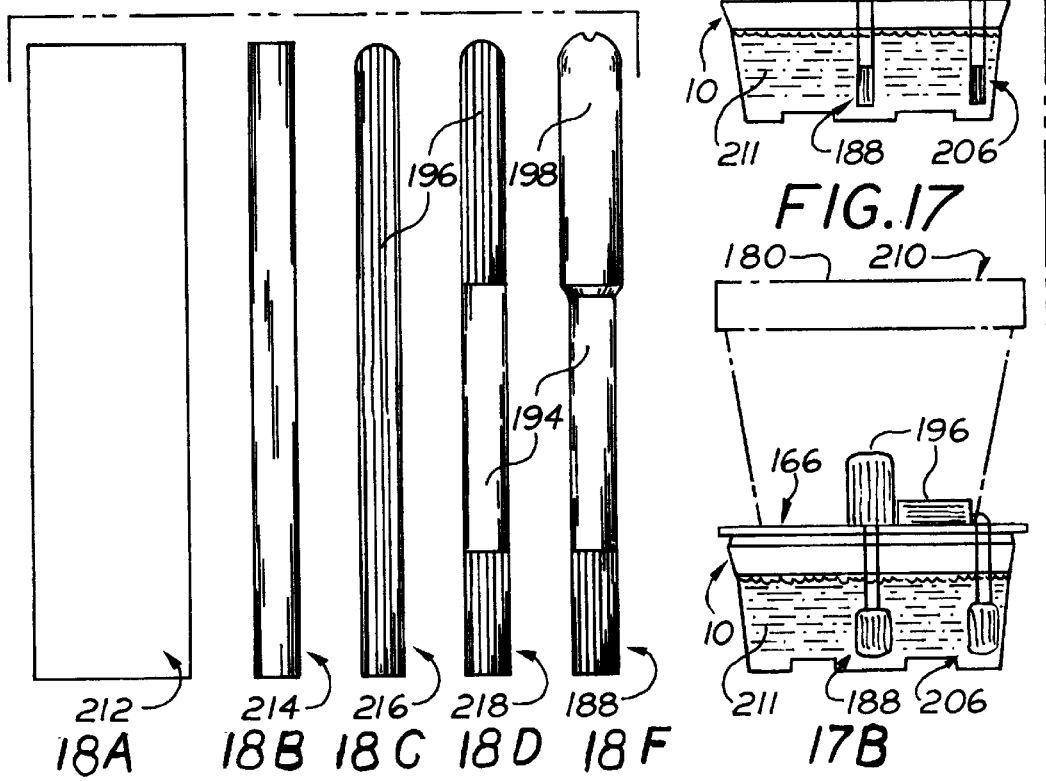

31A  31B  31C

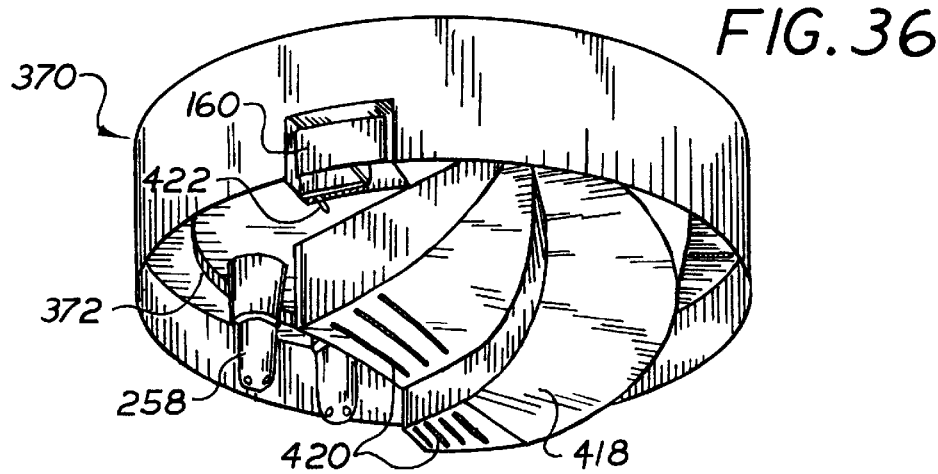
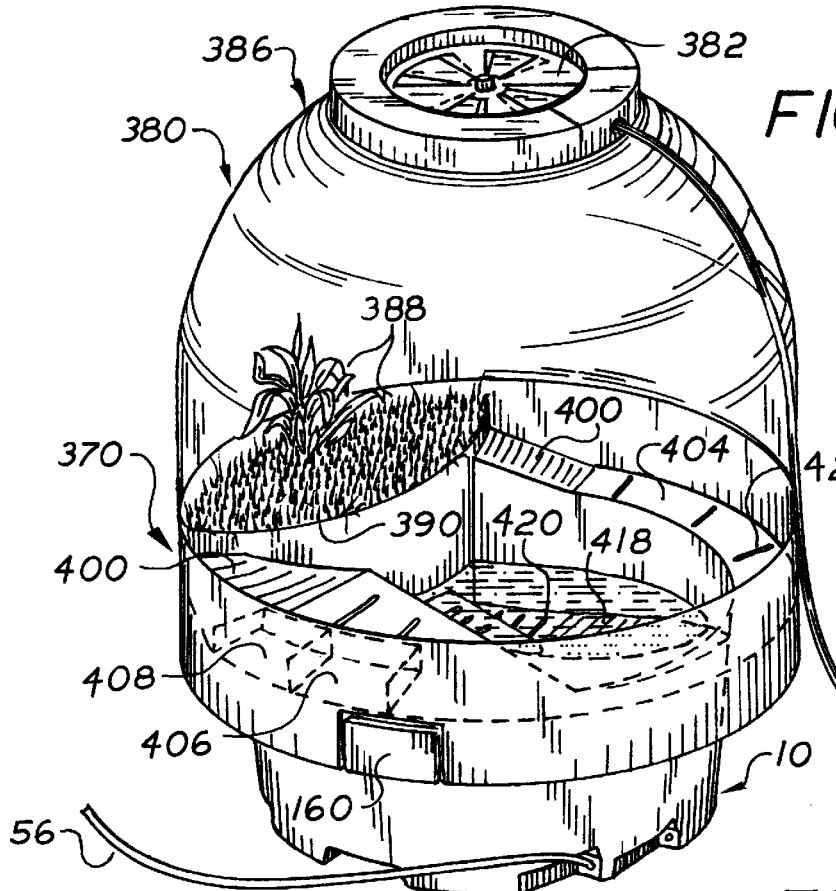
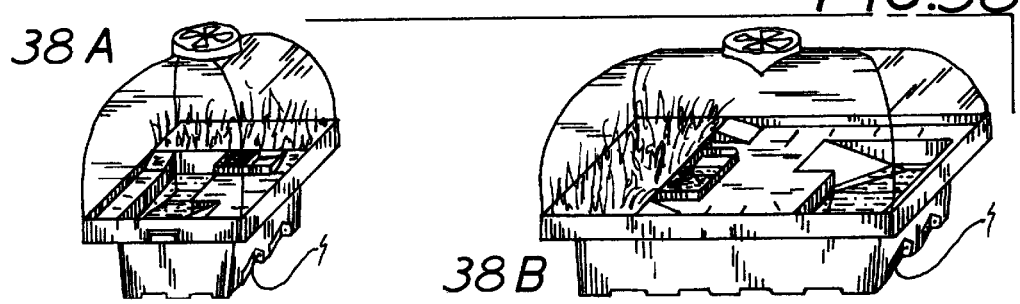

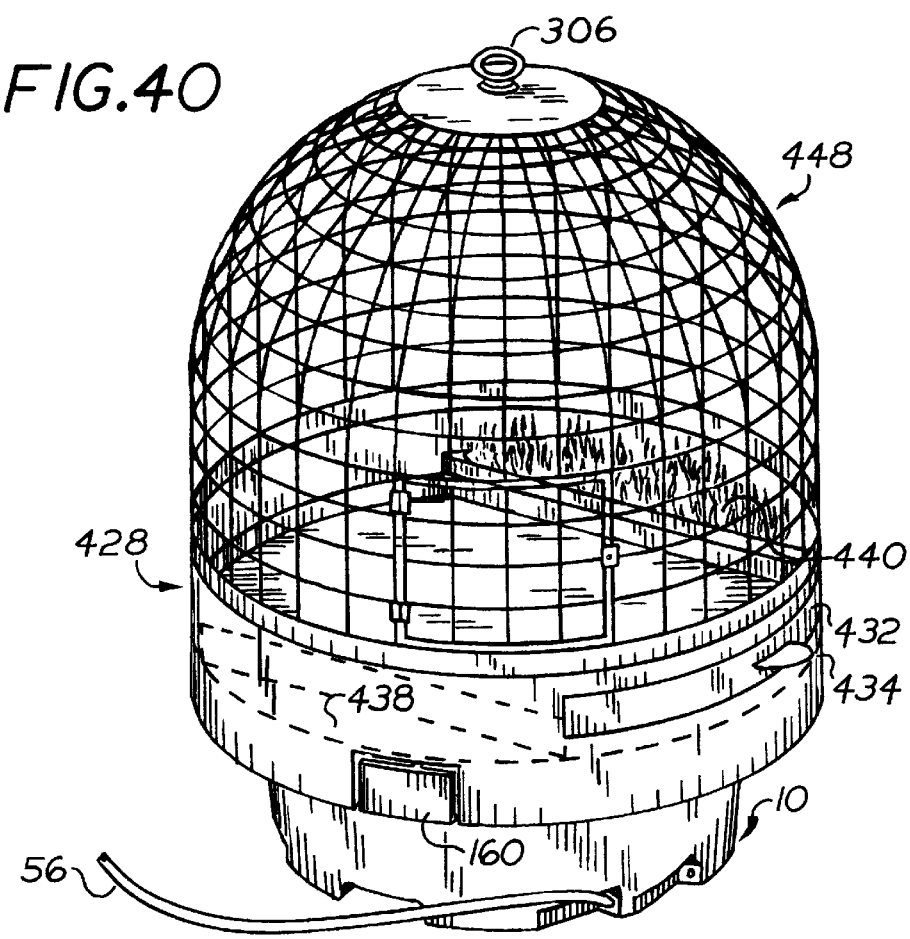
FIG.40
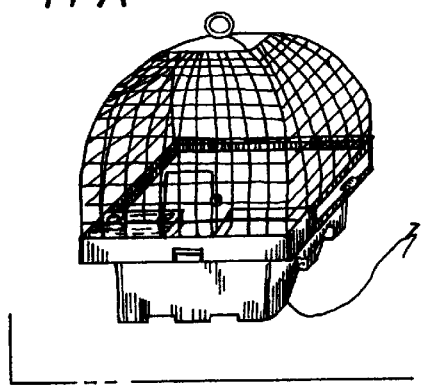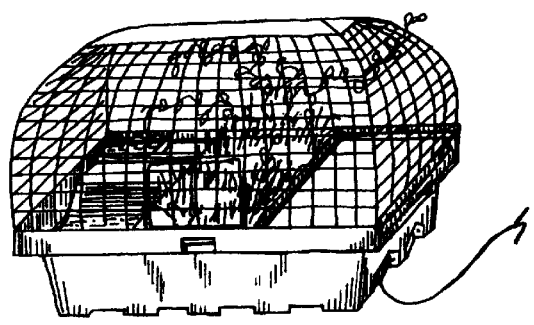
FIG.41

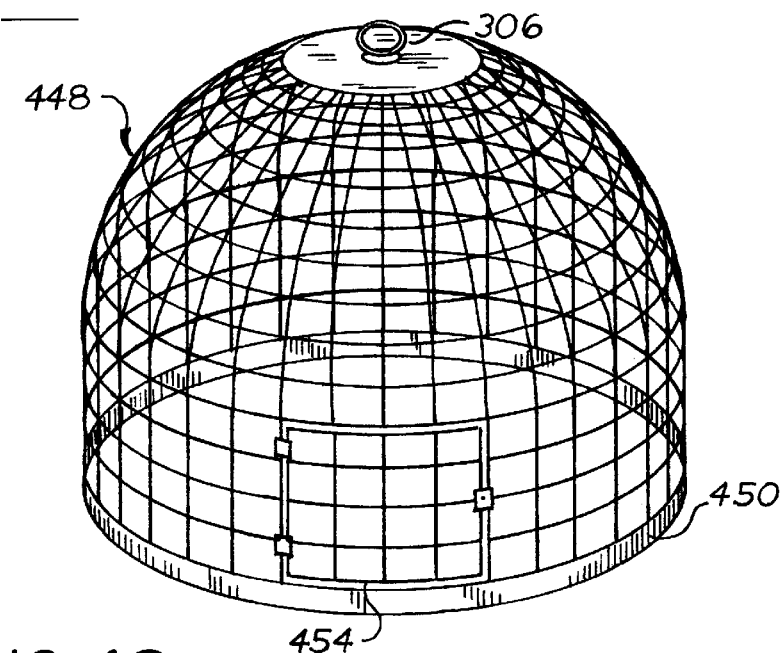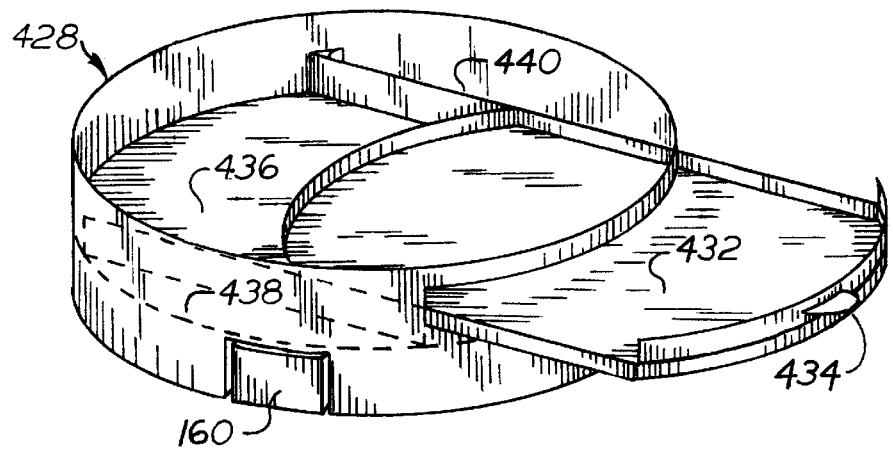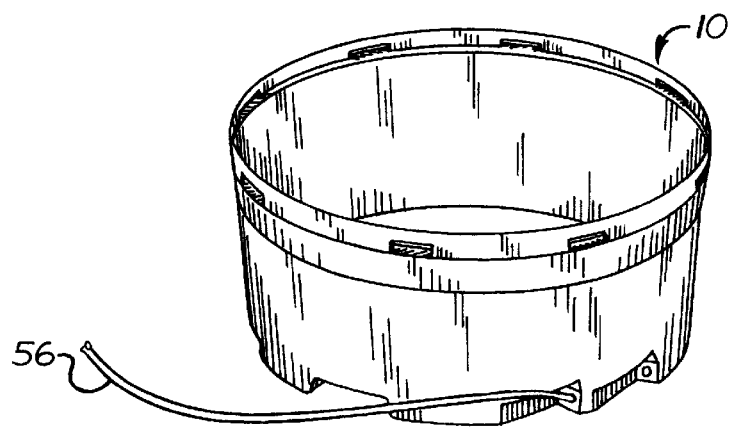
FIG. 42

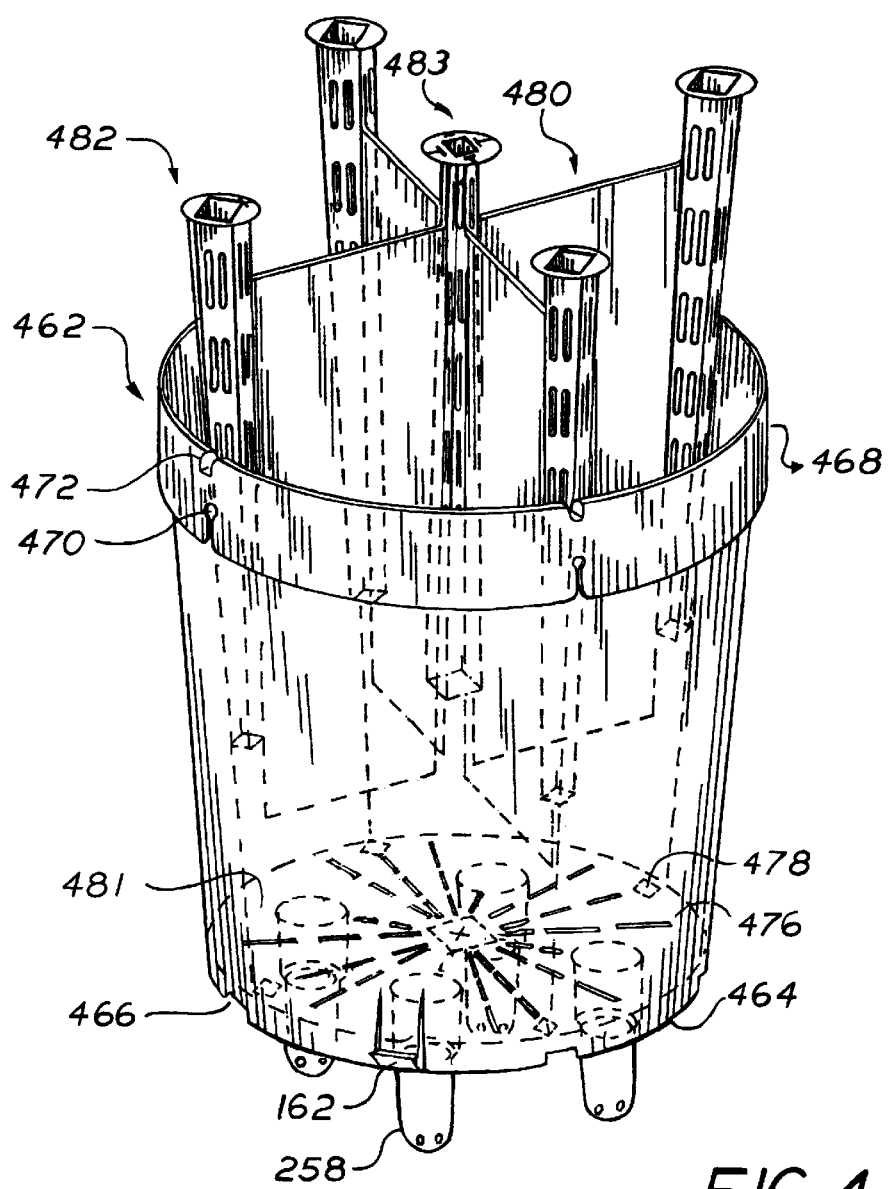
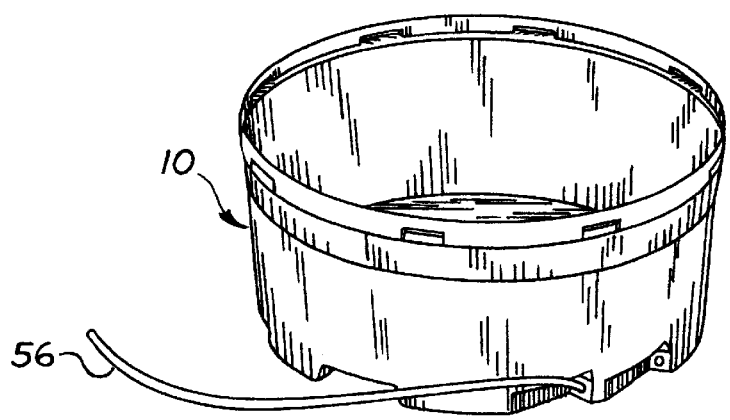
FIG. 44

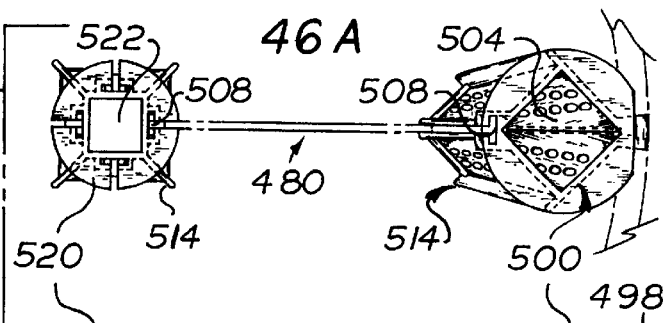
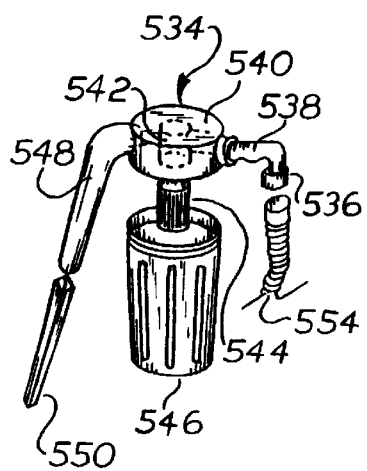
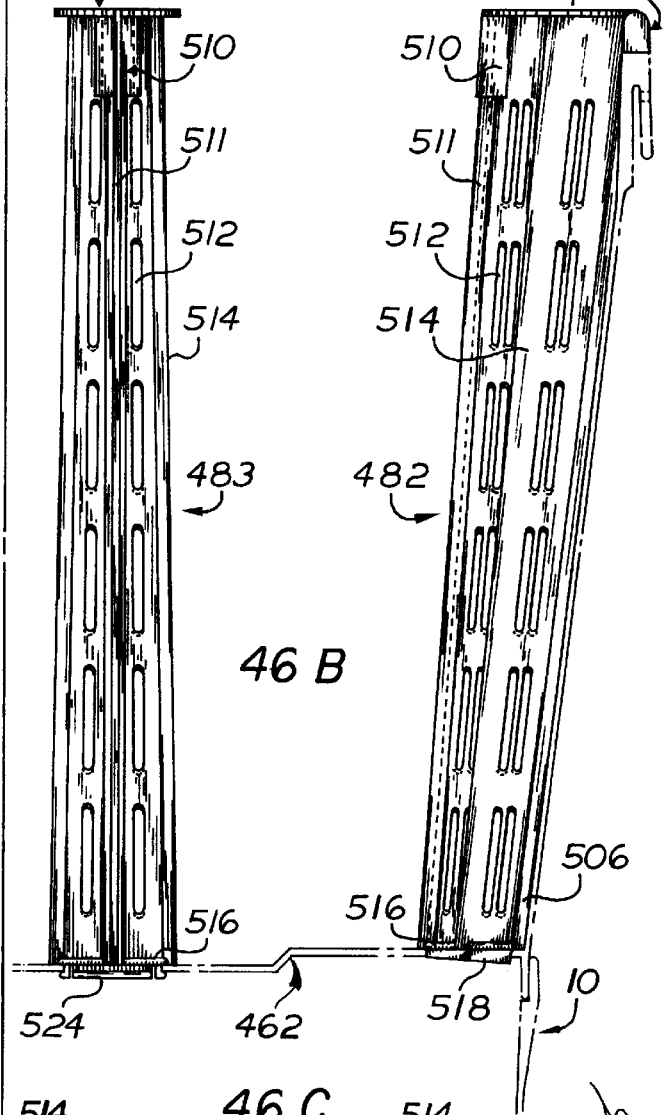
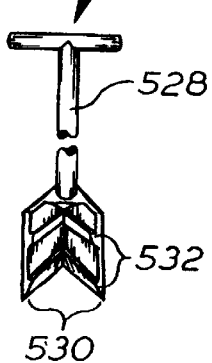
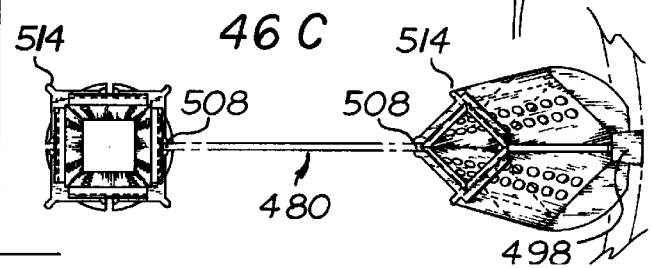

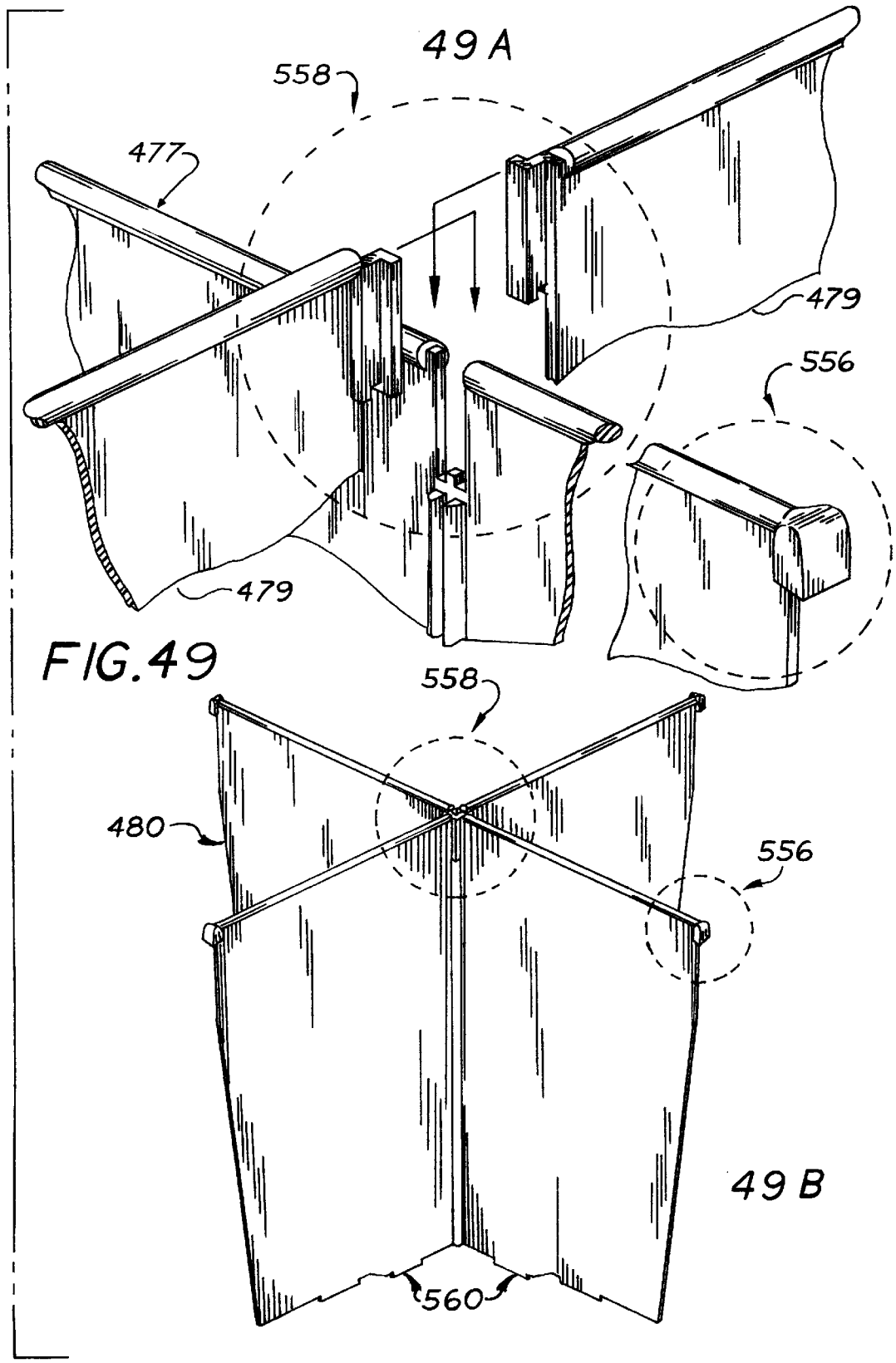

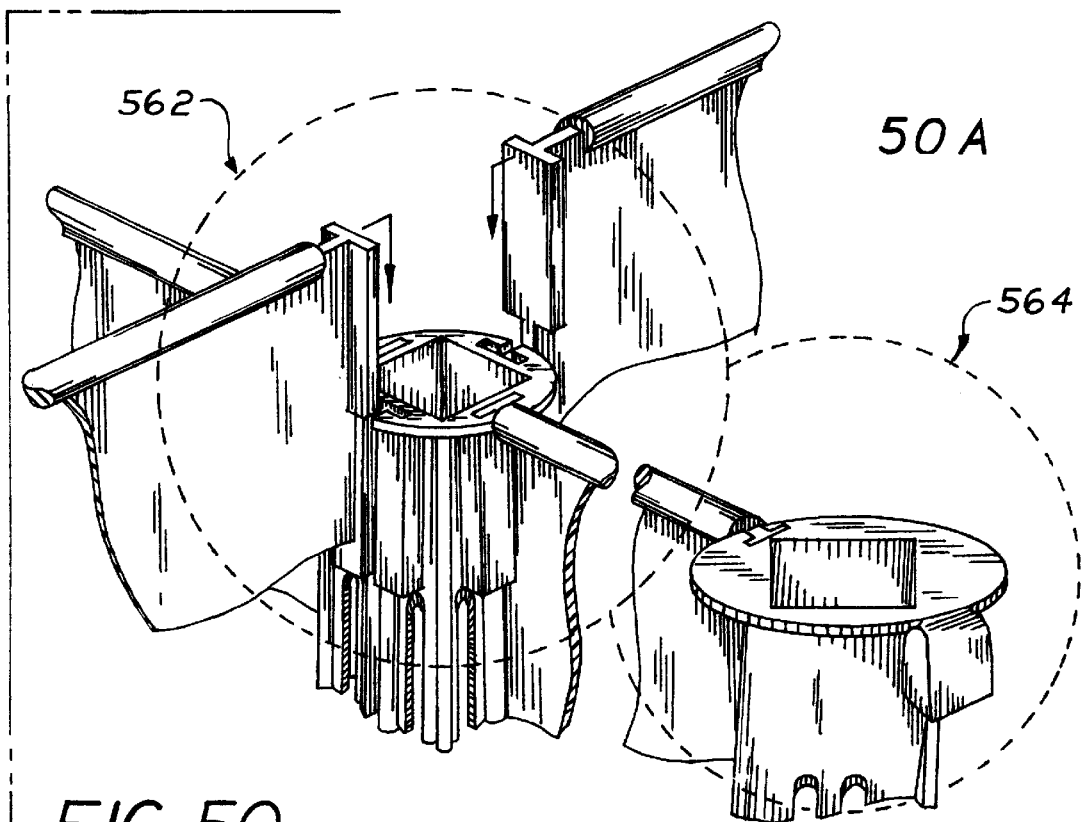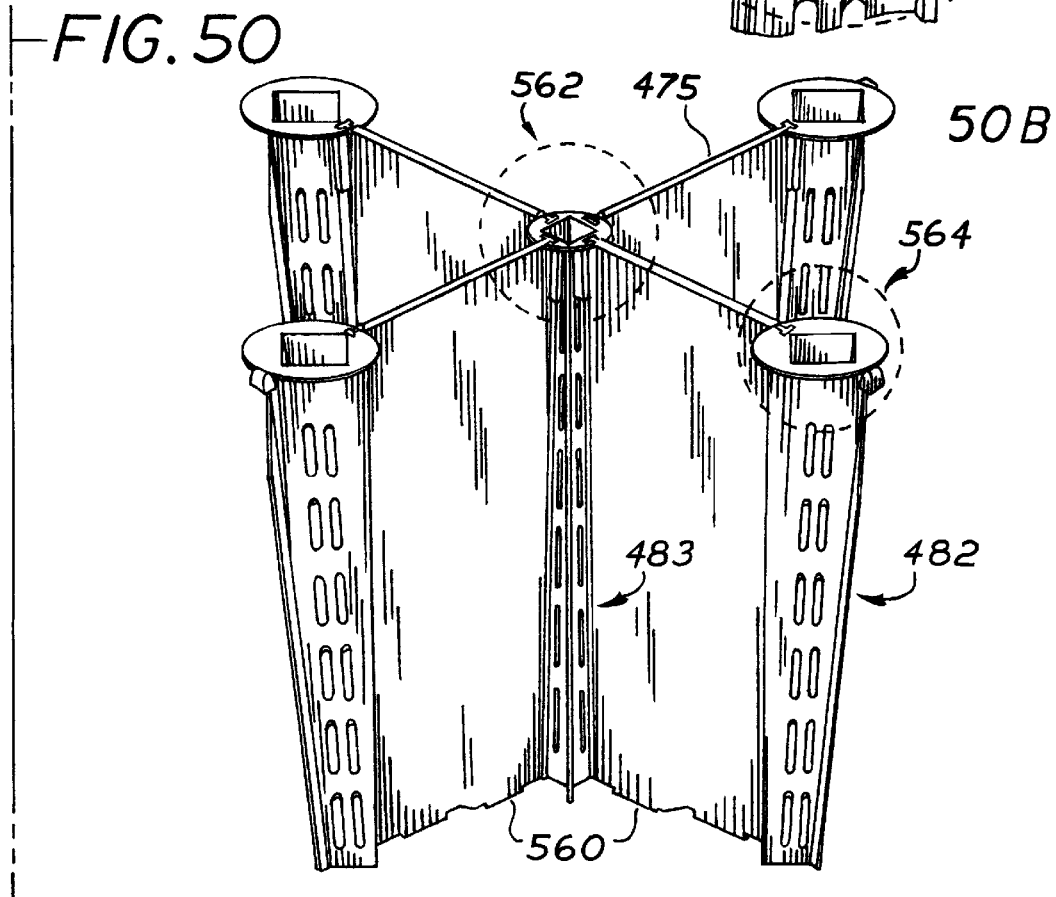
FIG. 50

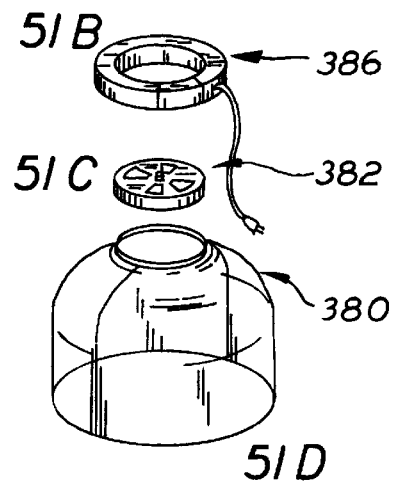
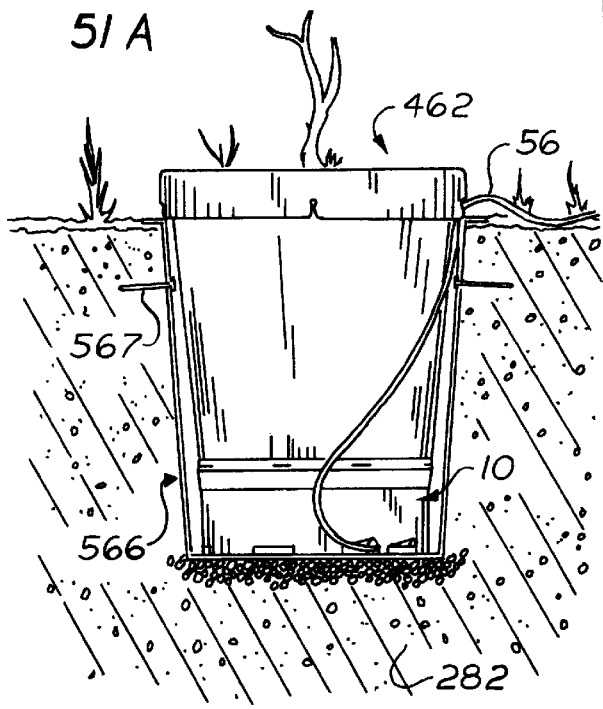
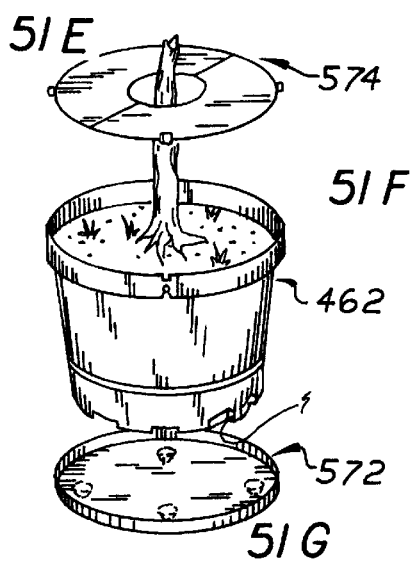
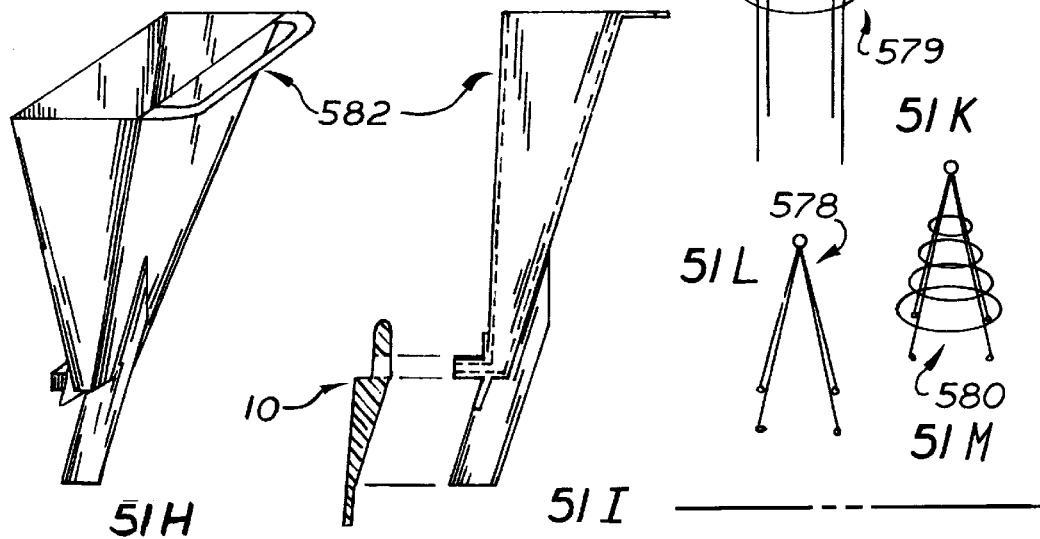
FIG. 51

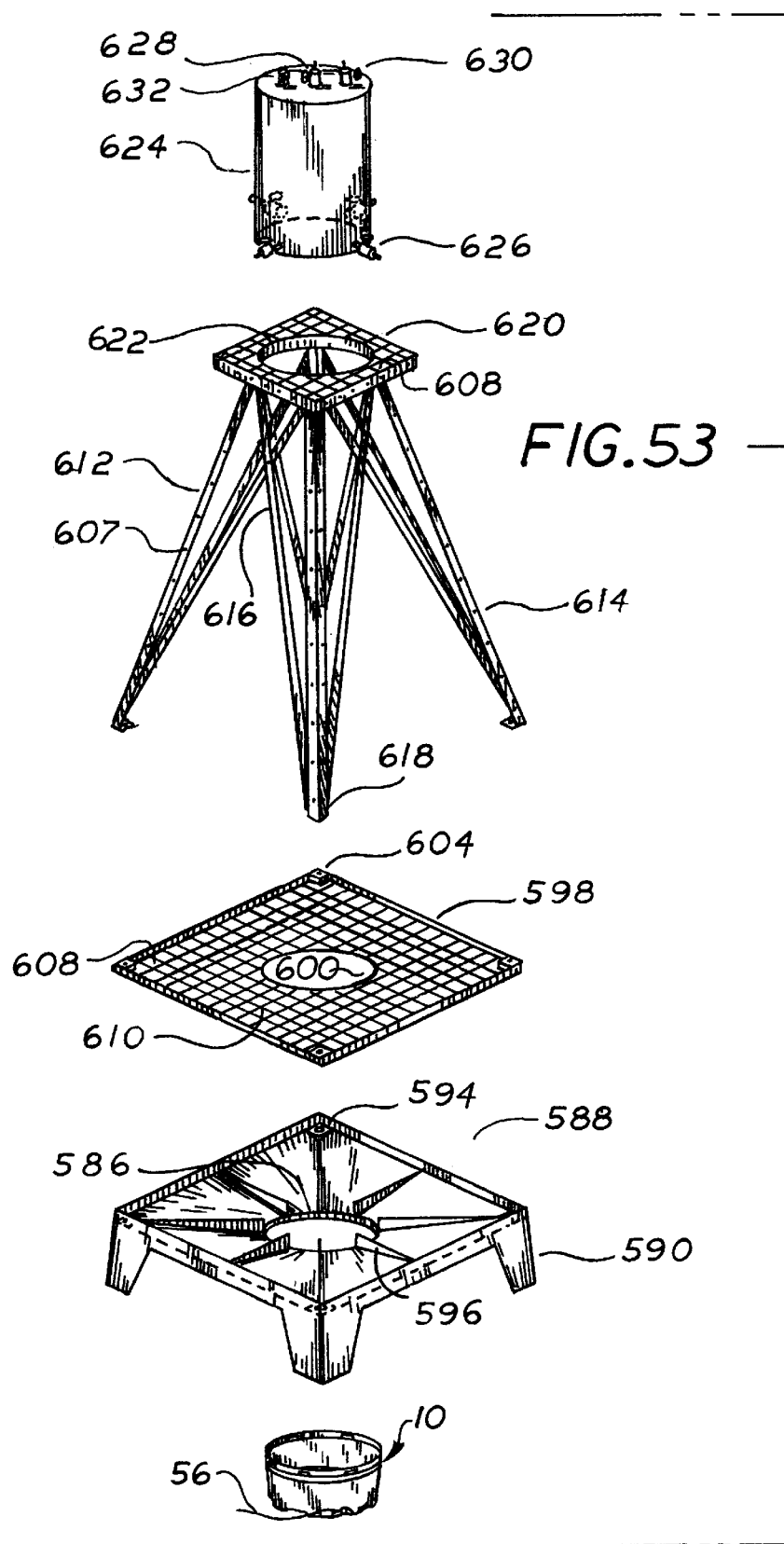

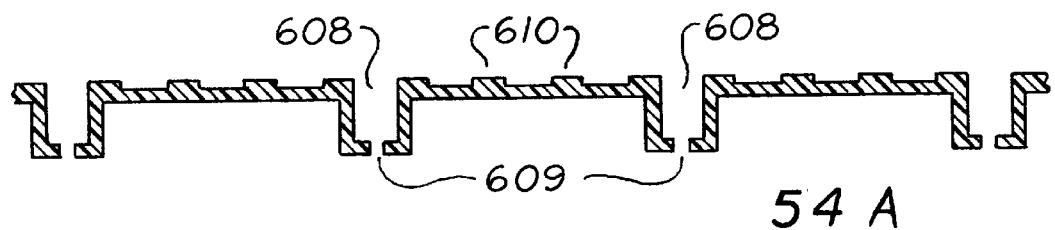
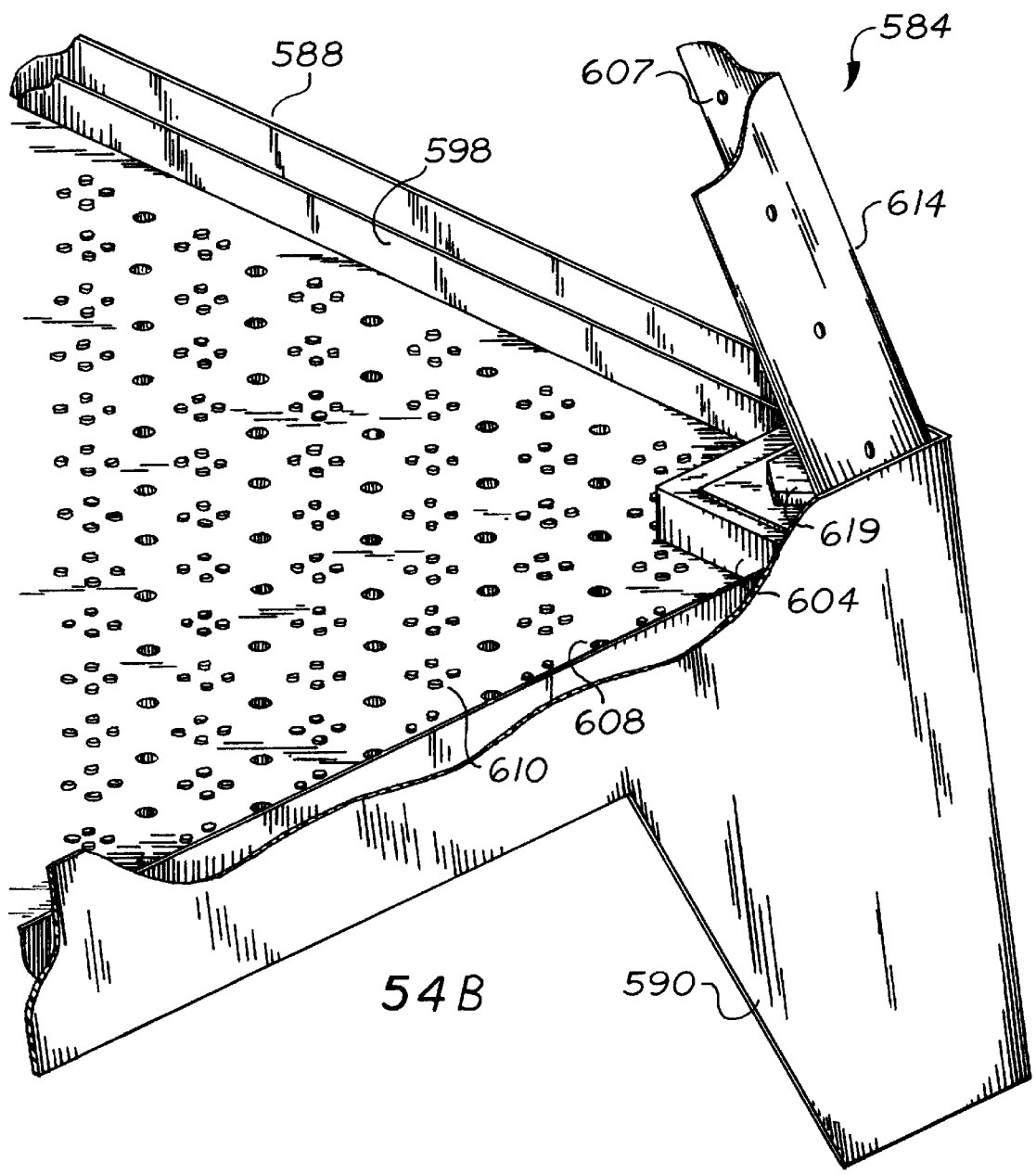

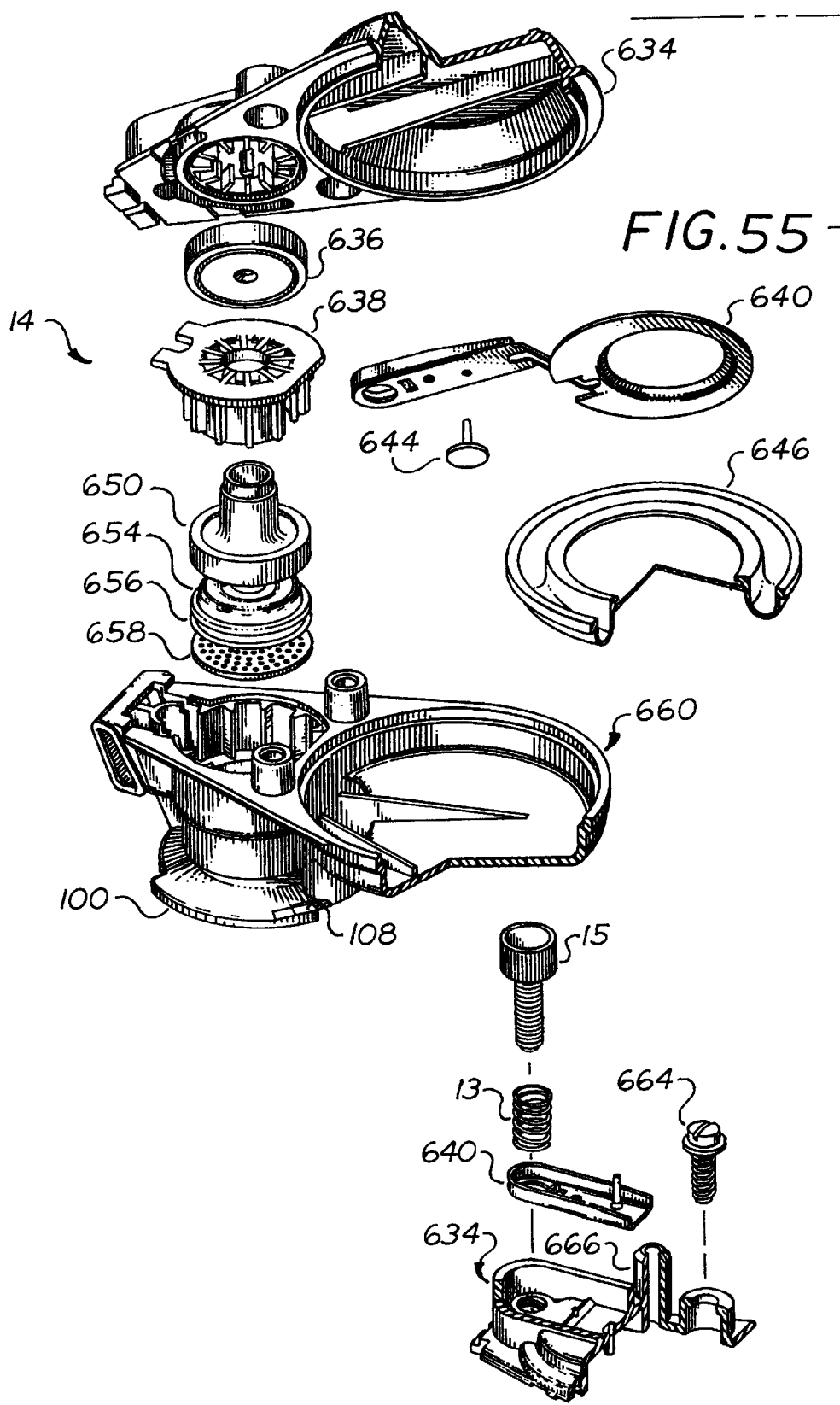

MULTI-PURPOSE SELF-WATERING SYSTEM

RELATED APPLICATIONS

This application is related to U.S. patent application Ser. No. 08/488,292 titled Multi-Purpose Automatic Filling and Leveling Fluid Basin With Water Transfer and U.S. patent application Ser. No. 08/479,712 titled Fill Valve filed in the names of the same inventors as this application on even date.

FIELD OF THE INVENTION

The present invention relates to a multi-purpose automatic filling and leveling fluid basin with water transfer and more particularly to such a basin which cooperates with a source of pressurized liquid such as water.

BACKGROUND ART

In its preferred embodiment, the present invention incorporates a number of improvements to a fluid diaphragm valve used for toilets, described in U.S. Pat. No. 4,240,606 and incorporated herein by reference.

A reliably repeatable self-leveling fluid valve that is also compact, inexpensive to manufacture and impervious to typical environmental forces, is needed in the so-called 'self watering' or 'automatic' growing containers for plants. The following eighteen patents allegedly describe some form of 'self watering' or 'automatic' growing container for plants:

| | | | |
|---|---|---|---|
| 3,733,746 | Allen Jr. | May 22, 1973 | Self Feeding Flower Pot |
| 3,758,987 | Crane Jr. | Sep. 18, 1973 | Automatic Plant Watering Device |
| 3,775,904 | Peters | Dec. 4, 1973 | Self-Watering Flower Pot |
| 3,783,555 | Peters | Jan. 8, 1974 | Self-Watering Flower Pot |
| 3,871,131 | Berglund | Mar. 18, 1975 | Self-Watering Plant Pots or Receptacles |
| 3,903,644 | Swift | Sep. 9, 1975 | Self-Watering Planter and Method of Making |
| 4,052,818 | Hagerty | Oct. 11, 1977 | Method and Apparatus for Containerizing Plants with a Self-Watering System |
| 4,148,155 | Allen | Apr. 10, 1979 | System and Apparatus for Automatically Feeding |
| 4,183,175 | Magee | Jan. 15, 1980 | Self-Watering Apparatus for Growing Plants |
| 4,198,784 | Sukes | Apr. 22, 1980 | Vessel for Supporting and Automatically Providing Liquid to Vegetation |
| 4,324,070 | Swister | Apr. 13, 1982 | Self-Watering Planter |
| 4,329,815 | Secrest | May 18, 1982 | Self Controlled Watering Planter Device |
| 4,344,251 | Edlung | Aug. 17, 1982 | Self-Irrigating Pot for Plants |
| 4,356,665 | de Oliveos | Nov. 2, 1982 | Self-Watering Planter |
| 4,527,354 | Sellen | Jul. 9, 1985 | Implantable Reservoir for Automatic Watering |
| 4,937,972 | Freitus | Jul. 3, 1990 | Self-Contained Plant Growth System |
| 5,020,261 | Lishman | Jun. 4, 1991 | Moisture Sensitive Self-Watering Planter |
| 5,341,596 | Kao | Aug. 30, 1994 | Automatic Water Supply Device for Potted Plants |

In fact, these containers are neither self-watering nor automatic because they require human refilling of the reservoir.

Three issued patents that are also true automatic plant pots are:

| | | | |
|---|---|---|---|
| 4,083,147 | Garack | Apr. 11, 1978 | Automated Planter Box System |
| 4,546,571 | Scrivens | Oct. 15, 1985 | Plant Watering Apparatus |
| 4,557,071 | Fah | Dec. 10, 1985 | Automatic Watering and Feeding System for Plants |

There is a need for a self-filling and self-leveling fluid basin which can perform a number of functions and cooperates with various other structures, including, but not limited to a plant pot converter, an animal water feeder, an underground spring, a bird bath, a humming bird feeder, an amphibian habitat, an animal/bird cage, a plant pot and a water toy.

SUMMARY OF THE INVENTION

The present invention relates to a device for dispensing water to a water using apparatus. The device comprises a basin having a substantially closed bottom, at least one side wall and an open top. A valve is associated with the basin. The valve has an inlet and an outlet. A water level sensor is provided for causing the valve to open when the water level in the basin is at a first level and for causing the valve to close when the water level in the basin has risen to a second level. A connector connects the valve inlet to a source of water under pressure wherein the water level in the basin does not drop below the first level or rise above the second level and a coupling is provided on the basin for securing the water using attachment to the open top of the basin.

BRIEF DESCRIPTION OF THE DRAWINGS

FIG. 1 is a perspective top view of the basin body prior to mating and fusing of the utility bracket to the underside of the basin;

FIG. 2 is a perspective top view of the utility bracket before fusing to the basin body shown in FIG. 1;

FIG. 5 is a plan view of the basin interior and structure with accessories as shown in FIG. 4;

FIG. 6 is a false combined sectional view of the basin components and valve as shown in FIG. 5 with critical components shown along the same plane to demonstrate clearances for the attachments;

FIG. 7A is a perspective view of the base of the valve shown in FIG. 6.

FIG. 7B is a perspective view of the multiple basin insertion plug that fits in the valve mounting flange shown in FIGS. 1, 5 and 6;

FIG. 7C is a perspective view of the manual operation insertion plug that fits in the valve mounting flange shown in FIGS. 1, 5 and 6;

FIG. 7D is a perspective view of the water and air isolating gaskets that fit in the valve mounting flange shown in FIGS. 1, 5 and 6;

FIG. 7E is a perspective view of the valve mounting flange, and basin insertion plugs as shown in FIGS. 1, 5 and 6;

FIG. 8A is a fragmentary sectional cutaway view of the gardener attachment latch mechanism that fits the vent/latch ports of the basin as shown in FIG. 1;

FIG. 8B is a fragmentary sectional cutaway view of the amphibian attachment latch mechanism that fits the vent/latch ports of the basin as shown in FIG. 1;

FIG. 8C is a fragmentary sectional view of the pot converter attachment latch mechanism that fits the vent/latch ports of the basin as shown in FIG. 1;

FIG. 8D is a fragmentary sectional view of the animal waterer attachment latch mechanism that fits the vent/latch ports of the basin as shown in FIG. 1;

FIG. 8E is a fragmentary sectional view of the underground spring attachment latch mechanism that fits the vent/latch ports of the basin as shown in FIG. 1;

FIG. 8F is a fragmentary sectional view of the bird bath attachment latch mechanism that fits the vent/latch ports of the basin as shown in FIG. 1;

FIG. 8G is a fragmentary sectional view of the hummingbird feeder attachment latch mechanism that fits the vent/latch ports of the basin as shown in FIG. 1;

FIG. 8H is a fragmentary sectional view of the amphibian habitat attachment latch mechanism that fits the vent/latch ports of the basin as shown in FIG. 1;

FIG. 8I is a fragmentary sectional view of the gardener attachment latch mechanism that fits the vent/latch ports of the basin as shown in FIG. 1;

FIG. 8J is a fragmentary sectional view of the water toy attachment latch mechanism that fits the vent/latch ports of the basin as shown in FIG. 1;

FIG. 16A is a perspective side view and a top view of the quick wick with removable sleeve for use with the pot converter attachment as shown in FIG. 13;

FIG. 16B is a perspective side view of the quick wick with a partially retracted removable sleeve, for use with the pot converter attachment as shown in FIG. 13;

FIG. 16C is a perspective side view and a top view of the quick wick with dissolving sleeve for use with the pot converter attachment as shown in FIG. 13;

FIG. 16D is a perspective side view of the right angle quick wick with dissolving sleeve for use with the pot converter attachment as shown in FIG. 13;

FIG. 16E is a sectional view taken along the line 1—1 of the right angle quick wick with dissolving sleeve as shown in FIG. 16D;

FIG. 17A is diagrammatic view of the quick wick immediately after insertion into a plant pot and placement on the pot converter attachment as shown in FIG. 13;

FIG. 17B is diagrammatic view of the expanded quick wick approximately one hour after insertion into a plant pot and placement on the pot converter attachment as shown in FIG. 13;

FIG. 18 shows the five step assembly process for the quick wick with dissolving head as shown in FIG. 16C;

FIG. 36 is a perspective bottom view of the amphibian habitat attachment for the basin in FIG. 4;

FIG. 37 is a perspective top view of the amphibian habitat attached to the basin shown in FIG. 4;

FIG. 38A is a perspective view of the square embodiment of the amphibian habitat as shown in FIG. 37;

FIG. 38B is an perspective view of the rectangular embodiment of the amphibian habitat as shown in FIG. 37;

FIG. 40 is a perspective top view of the animal/bird cage attached to the basin shown in FIG. 4;

FIG. 41A is an perspective view of the square embodiment of the animal/bird cage as shown in FIG. 40;

FIG. 41B is a perspective view of the rectangular embodiment of the animal/bird cage as shown in FIG. 40;

FIG. 42 is a perspective exploded view of the animal/bird cage attachment shown in FIG. 40;

FIG. 44 is a perspective exploded view of the gardener attachment shown in FIG. 43 with optional dividers and aerating root pruners;

FIG. 46A is a top perspective view of the aerating root pruners that fit the gardener attachment as shown in FIG. 43;

FIG. 46B is a side perspective view of the aerating root pruners that fit the gardener attachment as shown in FIG. 43;

FIG. 46C is a bottom perspective view of the aerating root pruners that fit the gardener attachment as shown in FIG. 43;

FIG. 47 has been deleted;

FIG. 48A is a perspective view showing the optional vacuum powered root cleaning accessory for the aerating root pruners as shown in FIG. 46;

FIG. 48B is a perspective view showing the manual ARP cutting tool accessory for the aerating root pruners as shown in FIG. 46;

FIG. 49A is an enlarged perspective detail view of the divider accessories for the gardener attachment shown in FIG. 43;

FIG. 49B is a perspective top view of the divider accessories for the gardener attachment shown in FIG. 43;

FIG. 50A is a perspective top view and an enlarged diagrammatic perspective view of the divider/aerating root pruners accessories for the gardener attachment shown in FIG. 43;

FIG. 50B is a perspective top view of the combined divider and aerating root pruners accessories for the gardener attachment shown in FIG. 43;

FIG. 51A is a side view of the bury bucket accessory for the gardener attachment as shown in FIG. 43;

FIG. 51B is a perspective view of the light assembly accessory for the gardener as shown in FIG. 43;

FIG. 51C is a perspective view of the dome vent assembly accessory for the gardener as shown in FIG. 43;

FIG. 51D is a perspective view of the dome accessory for the gardener as shown in FIG. 43;

FIG. 51E is a perspective view of the two piece protective cover for the gardener attachment as shown in FIG. 43;

FIG. 51F is a perspective view of the large embodiment of the gardener accessory as shown in FIG. 43, mounted on the basin as shown in FIG. 4;

FIG. 51G is a perspective view of the surface protector for the basin as shown in FIG. 4;

FIG. 51H is a perspective view of the basin funnel used to manually fill the basin as shown in FIG. 4;

FIG. 51I is a side view of the basin funnel shown in FIG. 51H used to manually fill the basin as shown in FIG. 4;

FIG. 51J is a perspective view of the carry handle accessory for the gardener as shown in FIG. 43;

FIG. 51K is a perspective view of the tomato trellis accessory for the gardener as shown in FIG. 43;

FIG. 51L is a perspective view of the hanger accessory for the gardener as shown in FIG. 43;

FIG. 51M is a perspective view of the trellis hanger accessory for the gardener as shown in FIG. 43;

FIG. 53 is a perspective exploded view of the water toy attachment shown in FIG. 52;

FIG. 54A is an cross sectional enlarged view of the building toy grid structure of the water toy attachment shown in FIG. 52;

FIG. 54B is an enlarged perspective view of the building toy grid and corner support structure of the water toy attachment shown in FIG. 52;

FIG. 55 is a perspective exploded view of the valve 14 and its adjusting screw that fits in the basin as shown in FIG. 4.

DESCRIPTION OF THE PREFERRED EMBODIMENT OF THE INVENTION

Figure 3:
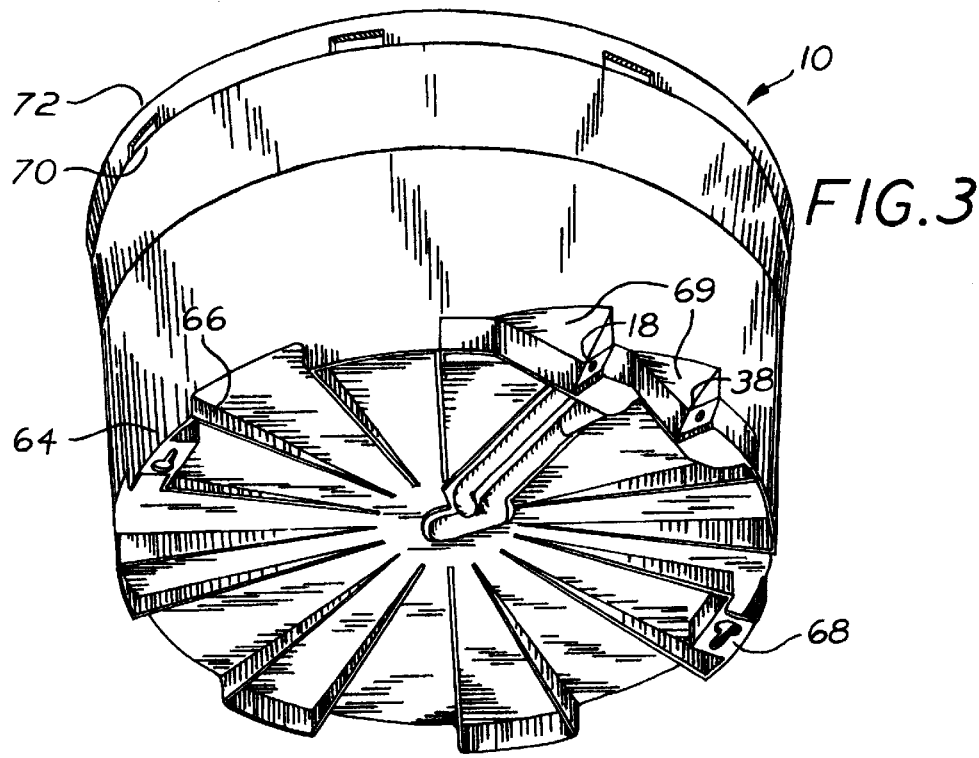
FIG. 3 is a perspective bottom view of the basin body and utility bracket mated and fused together.
Figure 4:
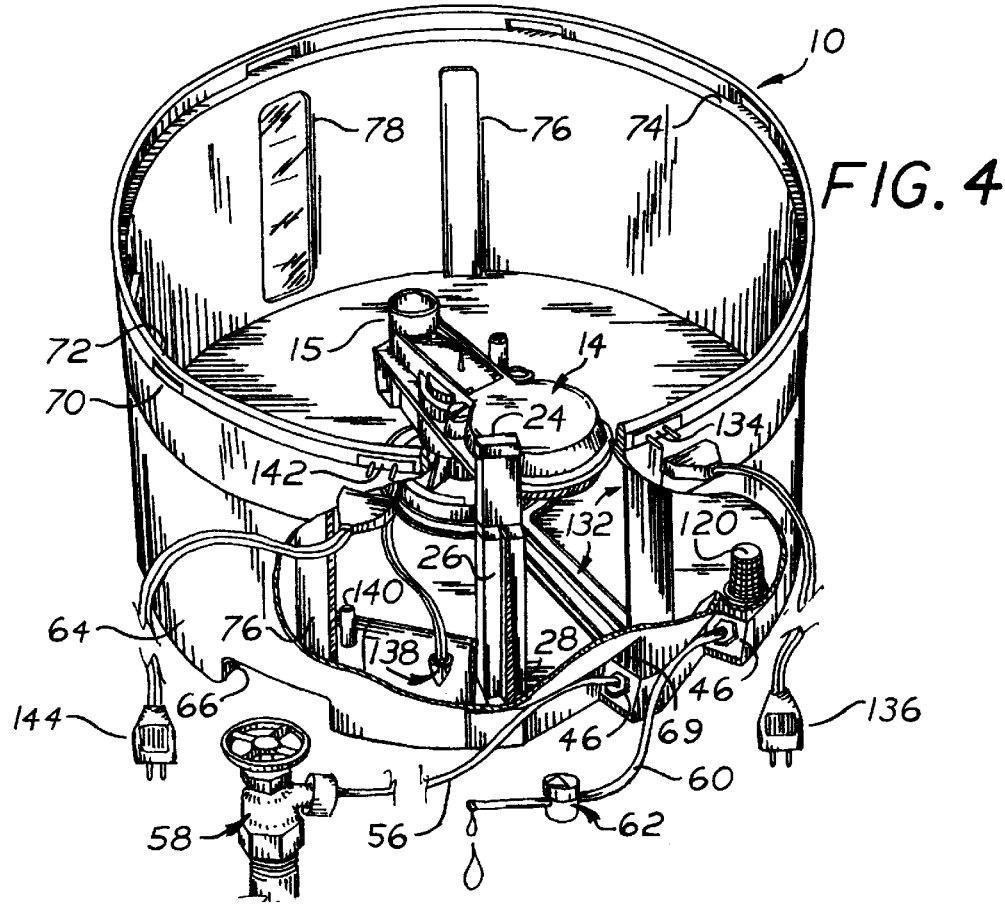
FIG. 4 is a perspective top view of the basin in its preferred embodiment with fittings.
Figure 9:
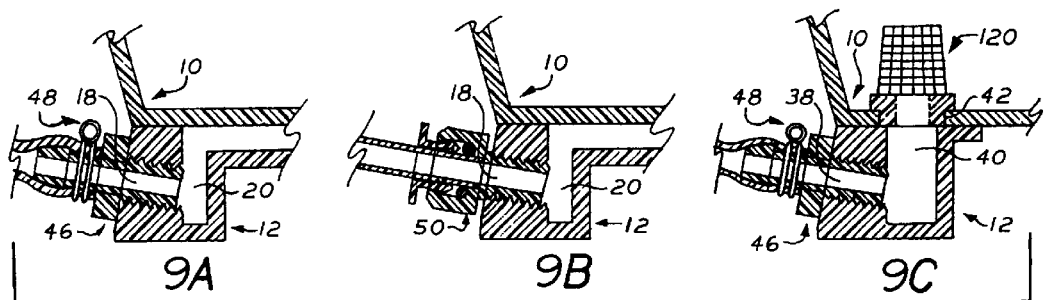
FIG. 9A is a fragmentary vertical sectional view on an enlarged scale of the basin water inlet port and fitting with hose as shown in FIG. 4 with a hose clamp.
FIG. 9B is a fragmentary vertical sectional view on an enlarged scale of the basin water inlet as shown in FIG. 4 with a quick disconnect fitting.
FIG. 9C is a fragmentary vertical sectional view on an enlarged scale of the basin water drain assembly as shown in FIG. 4 and a hose clamp.
Figure 10:
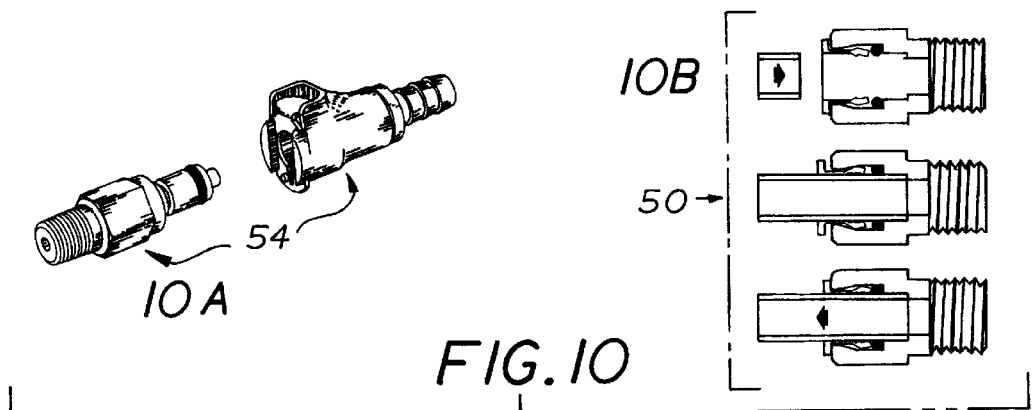
FIG. 10A is a perspective view on an enlarged scale of an optional quick disconnect with auto shut off fitting for the basin water inlet as shown in FIG. 4.
FIG. 10B is a diagrammatic set of sectional views on an enlarged scale of the operation of the quick disconnect fitting shown in FIG. 10A.
Figure 11:
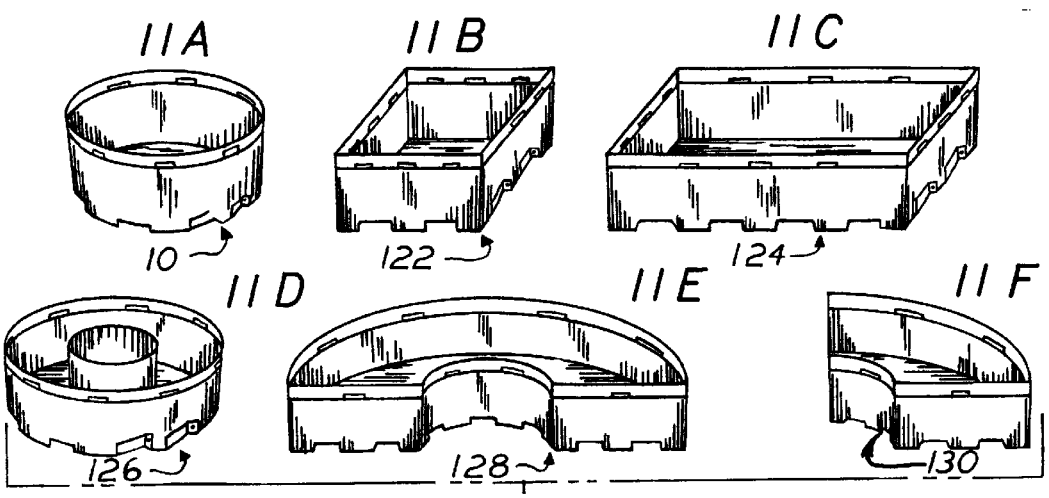
FIG. 11A is a perspective view on a reduced scale of the basin shown in FIG. 4.
FIG. 11B a perspective view of a square shaped version of the basin shown in FIG. 4.
FIG. 11C is a perspective view of a rectangularly shaped version of the basin shown in FIG. 4.
FIG. 11D is a perspective view of a doughnut shaped version of the basin shown in FIG. 4.
FIG. 11E is a perspective view of a ½ doughnut shaped version of the basin shown in FIG. 4.
FIG. 11F a perspective view of a ¼ doughnut shaped version of the basin shown in FIG. 4.
Figure 12:
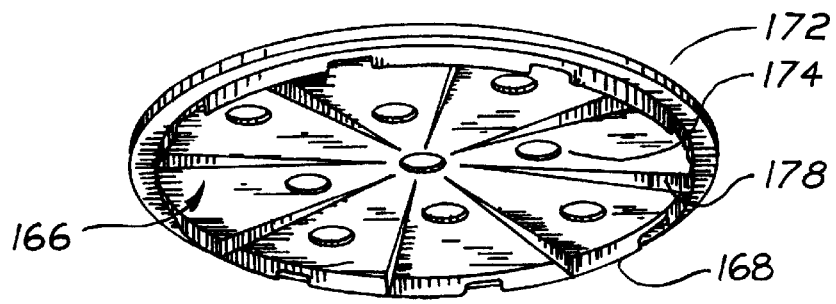
FIG. 12 is a perspective bottom view of the pot converter attachment that seats on the basin as shown in FIG. 4.
Figure 13:
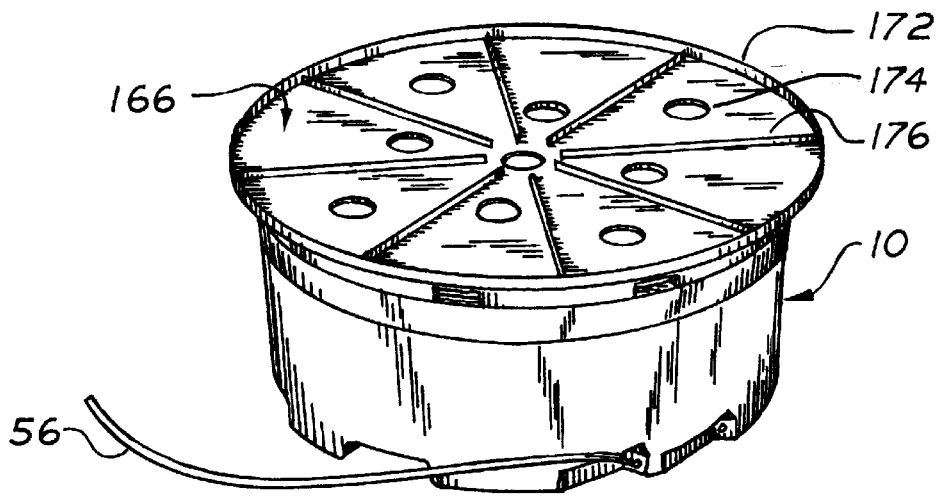
FIG. 13 is a perspective top view of the pot converter attached to the basin shown in FIG. 4.

The Multi-purpose Automatic Filling, and leveling Water Basin is a water holding vessel called the basin 10 which can be of any size or shape and will in most cases be produced by injection molding using plastics. The basin accepts within it a readily detachable adjustable fill valve 14 that is connected to a pressurized water 211 or other water supply 58. The valve fills and maintains the level of water 211 in the vessel which level can be selected and adjusted by the user.

The basin 10 is composed of two primary components ultrasonically welded together to form a water and air tight one piece unit. These components are called the basin body 16 and the air/water utility bracket or utility bracket 12. In addition to these fused parts are; the twist-in valve base compression cam 108 equipped automatic filling and leveling diaphragm valve 14; an air isolating gasket 98 and a matching water isolating gasket 96 that seal the areas between the valve 14 and the basin body 16, a snorkel cap 24, the insert x thread fittings 46 that fit the external water line port 18 and external drain line port 38 and the optional punch-in basin drain screen 120. The utility bracket 12, when fused to the basin body 16, performs three functions:

Water 211 (preferably filtered) is delivered from any pressurized source through a standard small guage water delivery line 56 (commonly referred to as drip irrigation line) connected to an optional existing quick disconnect fitting 50 and 54 and then connected directly or with additional water delivery line to the insert x thread barbed fitting 46 that threads into the utility bracket 12 in its external water line port 18. Attachment of the water delivery line 56 is facilitated by the space for thumb and fingers created by the utility access cutouts 69 just above the barbed fitting 46. The optional spring clamp 48 can be used to secure the water delivery line 56 to the insert x thread fitting 46. The water 211 flows through the water supply channel 20 and through the internal water port 22 on the bottom of the basin 10 and into the valve 14.

Ambient air for operation of the diaphragm valve 14 flows under the snorkel cap 24 down through the basin snorkel body 26 which is supported by the basin snorkel support rib 28, past the utility snorkel debris trap 30, around the utility snorkel 32, down into the utility air channel 34, through the air channel then up through the bottom of the basin 10, through the internal air port 36, into the air trough 92, into the valve base air port 106 and into the underside of the diaphragm in the valve 14. The snorkel cap 24 keeps debris emanating from the attachments or other sources from entering the basin snorkel body 26 and also acts as a 'diving bell' flood protection device. Should the basin 10 be in an environment where external water 211 elevates past the bottom edge of the basin vent/latch ports 70 and over the snorkel cap 24, the snorkel cap prevents entry of water 211 into the interior of the snorkel assembly as a result of its lower edge being below the upper edge of the basin snorkel body 26. The basin 10, with or without attachments can endure a true flood (if attached to a surface using the basin hold-down tabs 68 or otherwise held in place) and when no longer flooded will return to normal operation without failure including during the flood itself when the valve 14 shuts itself off. The snorkel cap 24 is ribbed on its interior surfaces to create secure multiple open vent grooves when pushed onto the basin snorkel body 26. Locating the snorkel assembly inside the basin 10 prevents accidental damage and prevents fouling by mud, dirt, water, insects, and other debris that could occur if ported anywhere external to the basin 10.

Water 211 is drained from the basin 10 by removing the tear out drain line tab 44 in the interior bottom edge of the basin and inserting the optional basin drain screen 120 into the internal basin drain line port 42 opened by the removed tear out tab and exposing the internal utility drain line port 40 which then accepts the basin drain screen 120. By connecting an small guage drain discharge line 60 to a insert x thread fitting 46 threaded into the external drain line port 38 the user may drain the basin and can attach a standard drain regulating valve 62 to control drain flow rates based on the attachment used and the requirements or desires of the user.

The utility bracket 12 is a uniform thickness throughout its entirety with two exceptions; the utility snorkel 32 walls can be thinner as they are protected by the basin snorkel body 26; and the areas immediately above the external water line port 18 and the external drain line port 38 which are small, thick pockets of material created as a result of injection mold release requirements. When ultrasonically fused the basin body 16 and the utility bracket 12 fit together and create completely isolated seals around each of the three functional areas (air, water and drain structures) listed above. After ultrasonic welding, the utility bracket 12 also finishes the basin feet 64 and completes the 'footprint' of the basin 10 as well as strengthening the basin bottom in the area where the basin ribs 66 are absent. For ease of storage and shipping the basin 10 stacks and nests at approximately ⅗ths of its own height by sitting on the basin stacking supports 76, all four of which surround the interior of the basin at approximately 90 degree increments. The top of the basin snorkel body 26 nests inside the hollows interior of the utility snorkel 32 above it. The scalloped bottom edge of the basin 10 is aligned so as to nest over and next to the basin stacking supports 76 with their mutual corner radii and thereby 'lock' the basin into place which prevents shifting and protects the basin snorkel body 26 and related assembly during storage, shipping and handling.

After installing the water isolating gasket 96 in the water gasket trough 88, and the air isolating gasket 98 in the air gasket trough 90, the valve 14 twists into the valve mounting flange 80 by slipping down past the retention tabs 82, (2 each opposing) and twisting approximately 90 degrees until the retention tab compression cams 84 (2 each opposing) and the valve base compression cams 108 (2 each opposing) mutually engage forcing the valve downward until the retention tab stops 86 (2 each opposing) stop the valve. The twisting downward motion during valve 14 insertion, compresses the larger diameter air isolating gasket 98 and the smaller diameter water isolating gasket 96 downward and outward into the four gasket retention rings 94 that border both sides of both gaskets and between which is created the air trough 92 which is an isolated encircling trough allowing ambient air portage even in the event of incomplete positioning of the valve 14. Valve base seating beads 101 are molded in relief on the underside of the valve base 100 surrounding the valve base water port 104 and enclosing within the outer circumferential bead the valve base air port 106. The seating beads 101 further compress the center of the surrounding gaskets 96 and 98, enhancing the sealing function and preventing the escape of pressurized water 211 or leakage in the the ambient air system. Due to the central axis location of the internal water port 22 and the opposing valve base water port 104, the delivery of water 211 is unaffected by valve 14 position. The valve 14 will operate when installed in either of the two possible insertion positions, however some of the attachments for the basin 10 require the valve be in its preferred position which is facing the utility portion of the basin and fully stopped by the retention tab stops 86. This allows the valve 14 position specific attachments to utilize all of the available space in the basin 10 by having the attachment 'hug' the basins interior walls and floor and wrap around the valve 14 and the basin snorkel body 26 assembly.

To function automatically, the basin 10 (with valve 14 installed) must be connected to a pressurized water line between 5 psi and 80 psi and with water 211 or other liquid near or at the consistent, of water and of a non-corrosive character. The user may adjust the level of the water 211 in the basin 10 by use of the valve adjusting screw 15, located on the top of the valve 14, which in cooperation with the surrounding valve adjusting screw 13 increases or decreases pressure on the valve lever 640. Minimum water 211 level is below the bottom edge of the adjusting screw 15. The maximum water 211 level is established by the user and the attachment connected to the basin 10, but is always below the basin vent/latch ports 70 of the basin 10. The user may monitor the water 211 level in the basin 10 by using the water level sight glass 78 on the 'front' wall of the basin 10. The basin 10 and all of its attachments operate at the minimum water 211 level, thus allowing the user (or environmental forces) to tilt the basin ten degrees or less without spilling water. The valve 14 and its water level control performance is unaffected by tilting.

To function manually (without the valve 14 in place) the basin 10 requires the manual operation insertion plug 110 be twisted by hand (with the water and air isolating gaskets 96 and 98 in place) using the manual operation insertion plug finger key 112 molded on the top of the plug. The manual operation insertion plug 110 is, on its lower portion, identical in shape to the valve base 100, and like the valve base has opposing manual operation insertion plug cams 114. When installed into the valve mounting flange 80, the insertion plug 110 seals the internal water port 22 and the internal air port 36 and turns the basin 10 into a reservoir that can be filled by the user using the detachable optional basin funnel 582 that slips through and mounts in any of the available basin vent/latch ports 70.

To function in series, a 'controlling' basin 10 with valve 14 installed is connected to a series of additional 'passive' basins that have multiple basin insertion plugs 116 installed in their valve mounting flanges 80 and are all on the same level surface as the controlling basin. The controlling basin 10 is connected to a constant water 211 supply 58 and must have the basin drain screen 120 installed and the drain discharge line 60 connected to the insert x thread fitting 46 threaded into the external drain line port 38 and connected to the external water line port 18 of the first 'passive' basin of the series. Water 211, controlled by the controlling basin 10, travels through the center of the multiple basin insertion plug water port 118 in the 'passive' basin. That passive basin in turn may have the drain discharge line 60 activated and connected in turn to additional 'passive' basins in series.

Attachments for the basin 10 all sit on the attachment seating rim 74. Some of the attachments are able to rotate on the basin 10 360 degrees (pot converter, underground spring, gardener and water toy) except when their respective latches FIG. 8 are in place through the basin vent/latch ports 70 located at equal increments around the basin immediately above the attachment seating rim 74. Attachments that are destined to be hung must be snapped into place with their respective latches (FIG. 8) to secure the attachment to the basin thus preventing rotation except for the increments mentioned previously. The remaining attachments sit on the basin 10 in only one position and snap into and out of place with a simple push or pull (depending on attachment style) by one finger on one or both of the latches of the attachment. To facilitate comfortable handling, the bottom edge of the basin 10 is rounded, as are the basin rim 72 and all the basins external and internal edges except the deliberate right angle on the interior and exterior edges of the attachment seating rim 74.

The basin 10 can be made in any imaginable shape or size. Some examples would be a square basin 122, a rectangular basin 124, a doughnut shaped basin 126, a semi-circle basin 128 and a corner basin 130.

Additional accessories for the basin 10 include, but are not limited to;

An optional heater 132 consists of a conductive element and thermocouple encased in a waterproof heat resistant injection molded shell formed to fit the basin 10 that is integrally molded to the waterproof heater male electrical terminal 134 that snaps into and passes through the basin vent/latch ports 70 on the upper rim of the basin and is connected by the heater plug and cord 136 to the controller, thermostat and power supply appropriate to the requirements of the basin and attachment size, style and function.

An optional centrifugal submersible water pump 138 can power accessories for all the basin 10 attachments. The pump 138 snaps into the pump mounting tabs 146 on the bottom interior of the basin 10, next to the basin snorkel body 26 assembly. A water conduit connected to the pump water outlet 140 can deliver pressurized water 211 to any of the accessories that utilize it. The water pump 138 is connected to its power source with a waterproof male electrical terminal 142 that snaps into and through the basin vent/latch ports 70 on the upper rim of the basin 10 and is connected by the pump plug and cord 144 to the controller and a power supply appropriate to the requirements of the basin and the attachment size, style and function.

The basin vent/latch ports 70 allow ambient air to enter the basin 10 when attachments are in place except when the user rotates those attachments (that can do so) and diminishes or cuts entirely the flow of ambient air into the basin. The basin 10 accepts the attachments using a number of different latches (FIG. 8) that all fit the basin vent/latch ports 70. The various styles of latches include but are not limited to; the pot converter latch 150, the underground spring latch 154, the bird bath latch 156, the hummingbird feeder latch 158, the amphibian habitat and animal cage latch 160, the gardener latch 162 and the water toy latch 164.

The Valve

The valve of the present invention shown in FIG. 55 is a modification of a valve originally conceived of and designed for use in toilets by Dwight N. Johnson of California. (U.S. Pat. No. 4,240,606, Dec. 23, 1980) incorporated herein by reference. This valve is currently being manufactured under the name FILLpro Toilet Tank Fill Valve and according to the manufacturer (Delta/Peerless Faucet Corp.) over nine million of the valves have been distributed worldwide since its inception. The mode of attachment of the valve of FIG. 55 must be completely redesigned and the adjusting screw and spring must be shortened to fit and operate with the present invention.

No modifications to the valve body itself as disclosed in U.S. Pat. No. 4,240,606 nor to its mechanism have been made, so the functionality of the valve is unaffected. Specially modified versions of the FILLpro valves have been operating continuously in test units that mimic the present invention in all of its embodiments. The tests have shown that both the anti-siphon and the standard models of the FILLpro valve are capable of reliable, long term, regulated flow rates as low as one drop per minute. Its inherent nature as a toilet valve, (requiring appropriate flow rates) means the valve is also able to respond quickly when needed with outstanding flow performance, plus the valve is extremely quiet. The valve functions effectively at any angle up to 30 degrees on any axis and is able to maintain a water level less than 6 millimeters above its own body (or fill a vessel many feet over its own body) and to do so repeatedly (for years) with excellent accuracy. The test valves have been disassembled and reassembled repeatedly with no change in performance and all of their parts are user replaceable.

The patent of Dwight N. Johnson (numbered U.S. Pat. No. 4,240,606 and describing a Fill Valve) is incorporated into this disclosure with the following modifications:

Water is delivered to the valve by the means and method disclosed in this application in the Description of the Preferred Embodiment of the Invention; paragraphs three, seven and eight.

Ambient air as required by the valve is provided by the means and method disclosed in this application in the Description of the Preferred Embodiment of the Invention; paragraphs four and seven.

(Connection and operation of the valve and the means and method thereof are disclosed in the Description of the Preferred Embodiment of the Invention; paragraphs eight and nine.

The physical changes to the valve from U.S. Pat. No. 4,240,606 are illustrated in FIGS. 4, 6, 7 and 55 of this specification and consist of two particular changes. First, the adjusting screw as disclosed by the Johnson patent and labeled in that patent as Reference Number 148, must have the unthreaded portion of its shank (Ref. #156 of Johnson) entirely removed, which shortens the screw to half its original height and allows the present invention to stack and nest with the valve installed and also increases the available area for the attachments to the present invention. The spring (Ref. #144 of Johnson) for the screw (Ref. #9148 of Johnson) must be replaced with a smaller lighter spring appropriate to the requirements of the shallow water levels used by the present invention. Second, the valve attachment assembly and its related hardware (best shown in the Johnson patent in FIG. 3) must be removed completely up to the line just above the Section Line 3, which is just below the base of the valve. Removing that portion of the valve leaves a flat base with a large hole in its center and two very small square holes side by side straddling the center line of the valve and projecting up and into the underside of the valve diaphragm assembly. The now flat, circular valve base 100 would have one if not two compression beads 107 molded into the base as well as the valve base compression cam 108 flanges, both shown in FIG. 7 with a side view shown in FIG. 6. The remaining component parts of the valve 14; the valve cover 634, valve assembly 636, diffuser 638, lever 640, pilot valve member 644, diaphragm 646, insert member 650, elastomeric body 654 outer ring 656, perforated disc member 658 and the outlet nipple 666 remain structurally and functionally identical to the Johnson valve of U.S. Pat. No. 4,240,606.

SUMMARY OF THE PREFERRED EMBODIMENTS OF THE ATTACHMENTS TO THE INVENTION

Garden Pot Converter Attachment

Figure 14:
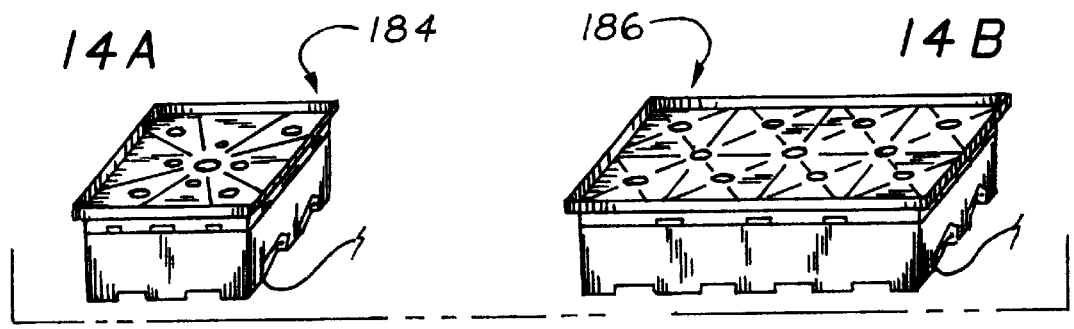
FIG. 14A is a perspective sketch showing a square embodiment of the pot converter as shown in FIG. 13.
FIG. 14B is a perspective sketch showing a rectangular embodiment of pot converter as shown in FIG. 13.
Figure 15:
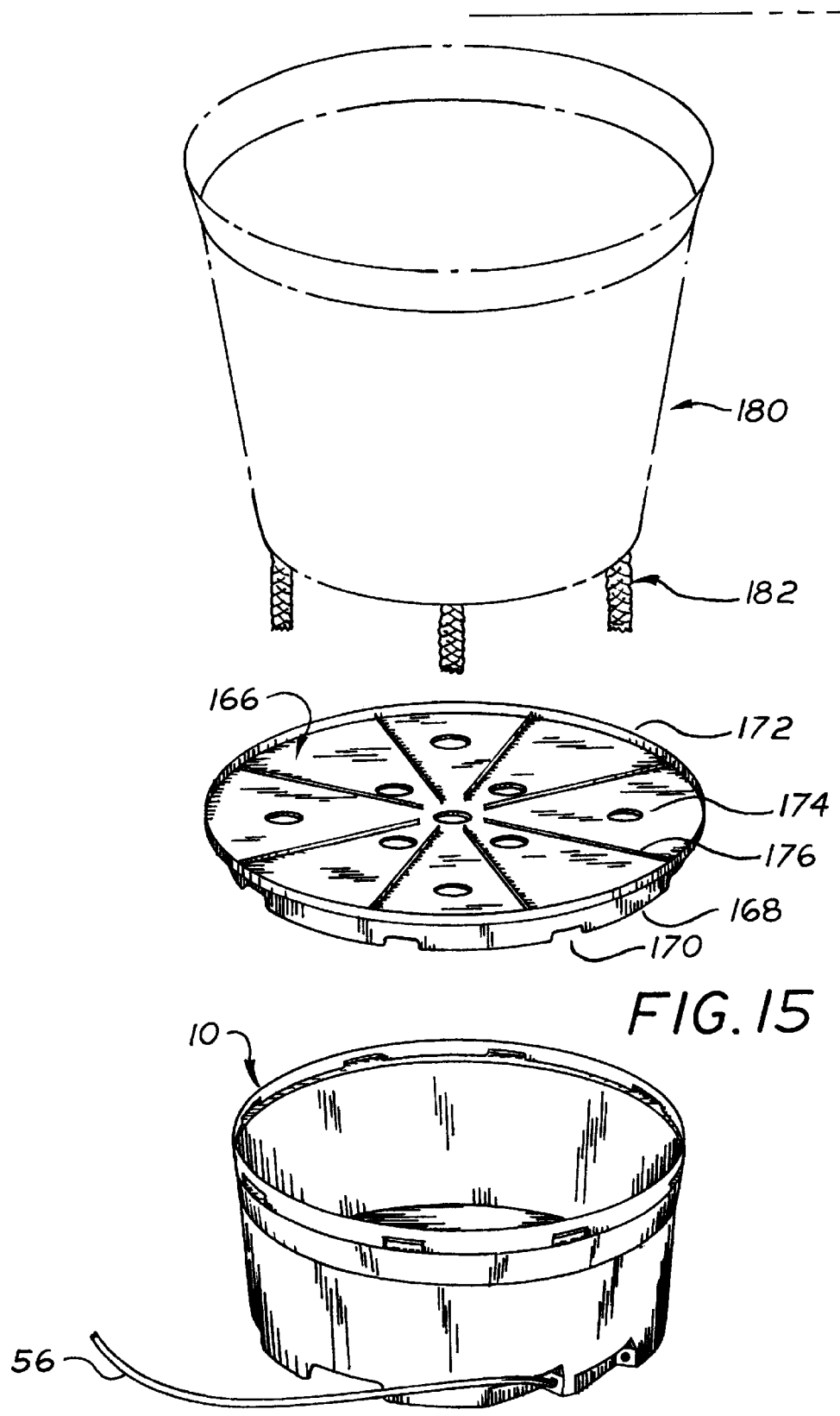
FIG. 15 is a perspective exploded view of the pot converter as shown in FIG. 13 with an existing plant growing pot with rope wicks.
Figure 19:
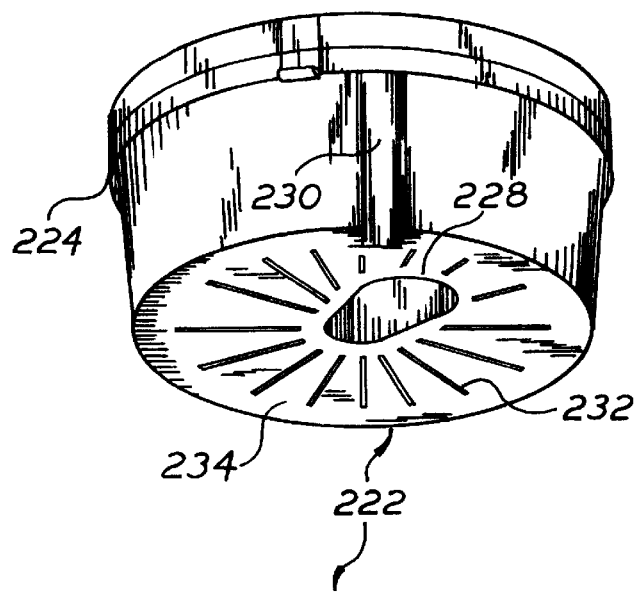
FIG. 19 is a perspective bottom view of the animal waterer attachment for the basin in FIG. 4.
Figure 20:
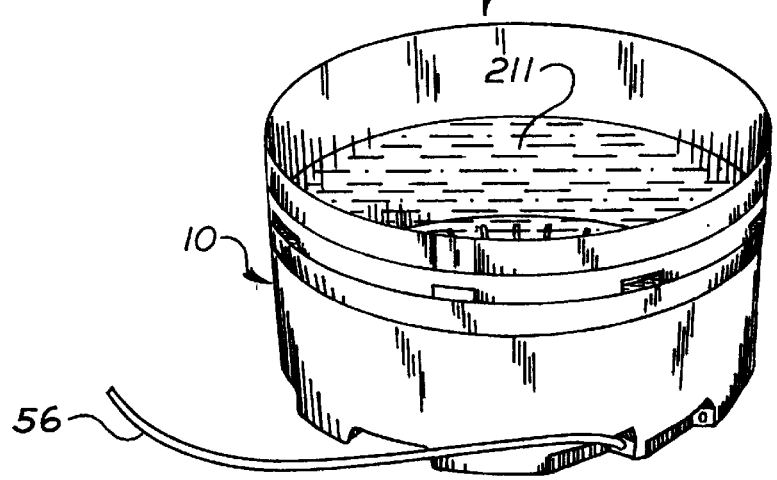
FIG. 20 is an perspective top view of the animal waterer attached to the basin shown in FIG. 4.
Figure 21:
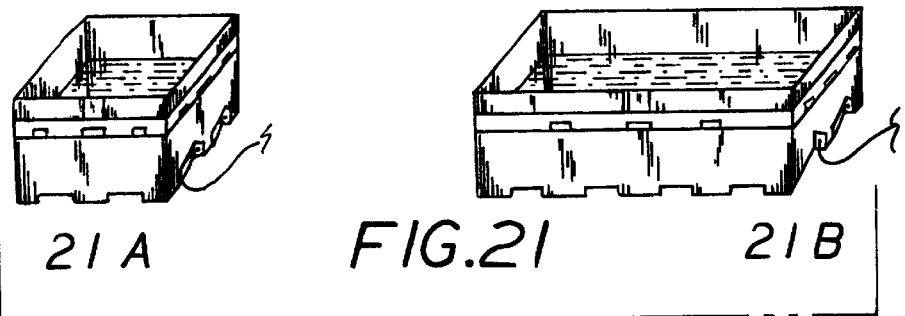
FIG. 21A is an perspective sketch showing a square embodiment of the animal waterer as shown in FIG. 20.
FIG. 21B is an perspective sketch showing a rectangular embodiment of the animal waterer as shown in FIG. 20.
Figure 22:
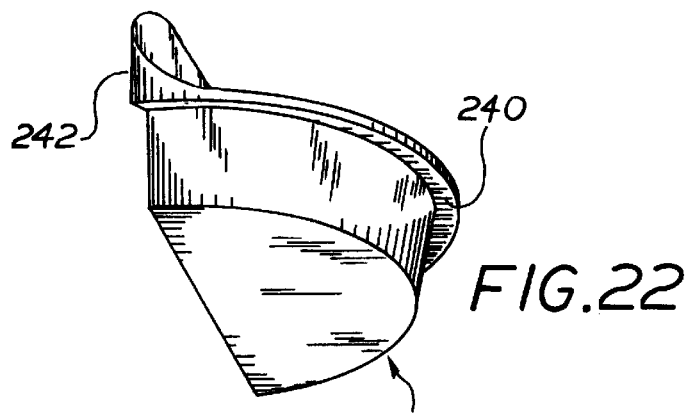
FIG. 22 is an perspective bottom view of the feeder attachment to the animal waterer shown in FIG. 20.
Figure 23:
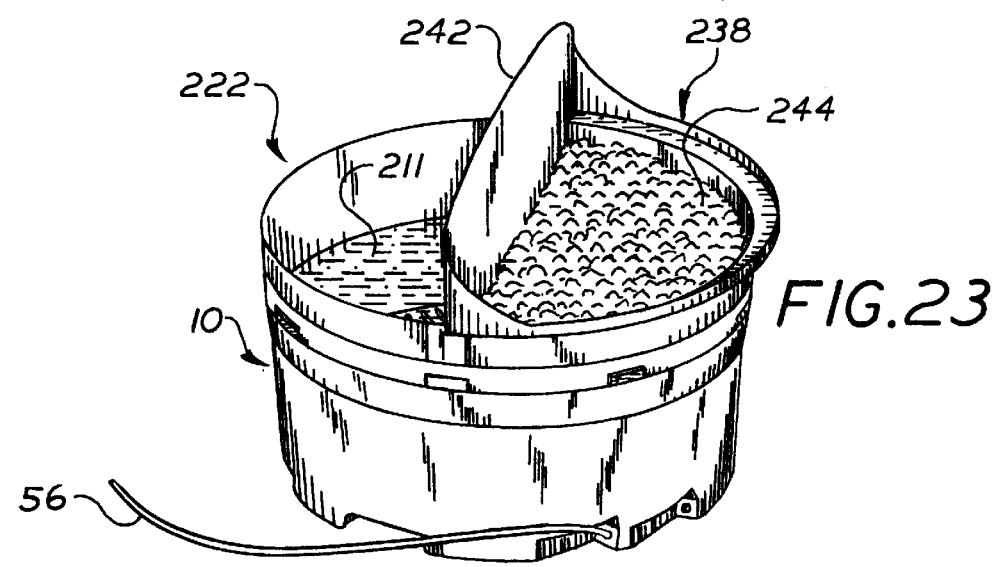
FIG. 23 is an perspective top view of the feeder attachment seated on the animal waterer as shown in FIG. 20.
Figure 24:
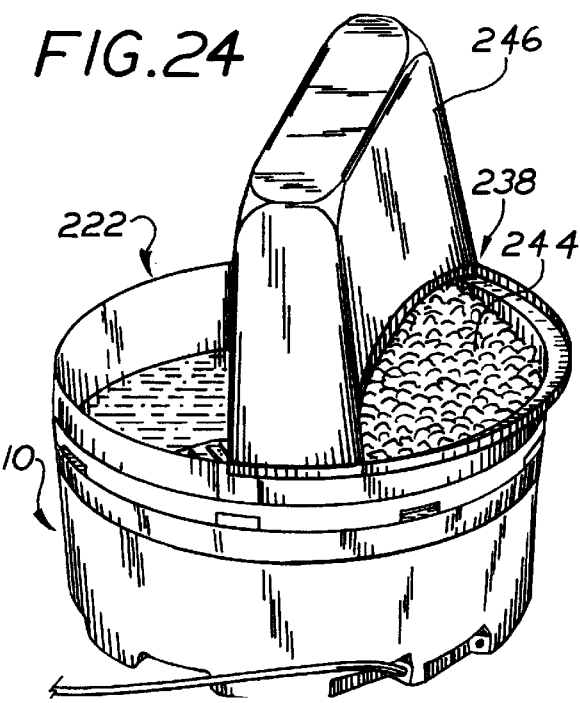
FIG. 24 is an perspective top view of the bulk storage accessory for the feeder attachment shown in FIG. 22.

The pot converter attachment 166 for the basin 10 allows the user to take an ordinary plant pot 180 of almost any style or type (bottom or side drainage) and convert it into a true self watering pot, or if they wish use the basin 10 and pot converter 166 (without the valve 14) as a wicking reservoir for the pot that the user would refill manually. The user places the converter attachment 166 onto the basin 10 by matching the pot converter seating rim 168 and the basin attachment seating rim 74 and rotating the attachment until the two opposing pot converter latches 150 engage the basin vent/latch ports 70. The user then inserts ordinary wicks 182 or quick wicks 187, 188 or 206 (see FIGS. 16,17 and 18) into the drainage holes of the existing pot. The pot converter wick holes 174 located on the top surface of the converter 166, allow the wick/s 182 or 188 to pass through and into the water 211 of the basin 10. Capillary wicking and the plants natural osmotic forces will draw water 211 from the basin 10 which will refill automatically when equipped with the valve 14. The user can lift the pot and converter attachment by gripping the converter 166 with both hands and pushing one or both of the pot converter latches 150 and twisting and/or lifting up. The converter seating rim 168 which is interrupted by the pot converter vent slots 170 that align with the basins vent/latch ports 70, acts as a stable set of feet for the converter attachment 166 when it is removed from the basin 10, thereby preventing damage to the dangling tricks 182. The converter 166 will accept any size pot 180 up to its maximum diameter defined by the pot converter upper rim 172. The converter attachment 166 can be made to fit any size or style basin 10, (examples are the square converter 184 and the rectangular converter 186 shown in FIG. 14) allowing the converter to accept a wide variety of pots. On the underside of the converter 166 are pot converter support ribs 178, that strengthen the converter unit and pass through the horizontal surface and form on its upper side the drainage elevation ribs 176 that separate the ordinary plant pot 180 from the converters horizontal surface and enhance ventilation and prevent water 211 from collecting under the pot. The pot converter 166 is particularly suited for converting existing ordinary pots 180 with plants in them into automatic pots instantly when used with either of the three styles of insertable quick wick 187, 188 and 206.

The quick wicks are made by taking a loose matt of fine polyester and nylon microfilament material 212 and rolling and compressing it into a rolled wick 214, after which a folded expanding sleeve 196 made of permeable polyester material similar to the lining in diapers is slipped over the rolled wick 214, creating the expanding membrane wrapped wick 216, after which an impermeable cover 194 is slipped over or wrapped and sealed around the wick now wrapped in an impermeable cover 218. The impermeable cover 194, covers the shaft, no matter what length of the quick wick 187, leaving the top and the bottom of the wick uncovered as shown in FIG. 54D. The quick wick cross section 220 shows a view through either of the quick wick sleeves 187 and 188. One of two insertion sleeves can be placed on the quick wick 182, 187,188 or 206 giving the user two ways to insert the wick. The removable sleeve 190 allows the user to shove the quick wick 187 into any pot leaving the removable sleeve grip 193 visible below the plant pot 180 and ready to be pulled back and off the wick which action is facilitated by the removable sleeve head slits 192 that open allowing the sleeve to travel the length of the wick body. The dissolving sleeve 198 is made of molded hardened gelatin and slips over the wick like the removable sleeve 190 but stays on the wick after insertion into the pot 180 where fluid from below wicks upward and through the dissolving sleeve tip hole 204 which dissolves the sleeve from both inside and out. See FIG. 17 to see examples of the quick wick dissolving head at insertion 208 and the quick wick dissolving head after expansion 210.

Animal Waterer Attachment

Figure 25:
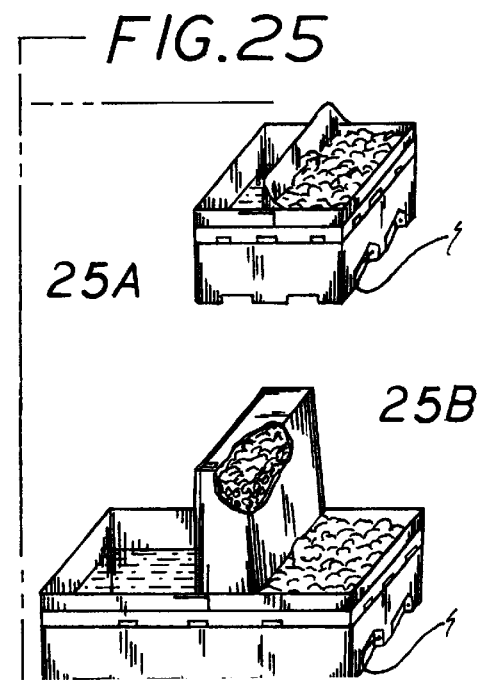
FIG. 25A is an perspective sketch showing the square embodiment of the animal waterer/feeder as shown in FIG. 23.
FIG. 25B is a perspective sketch showing the rectangular embodiment of the animal waterer/feeder with bulk storage accessory as shown in FIG. 24.
Figure 26:
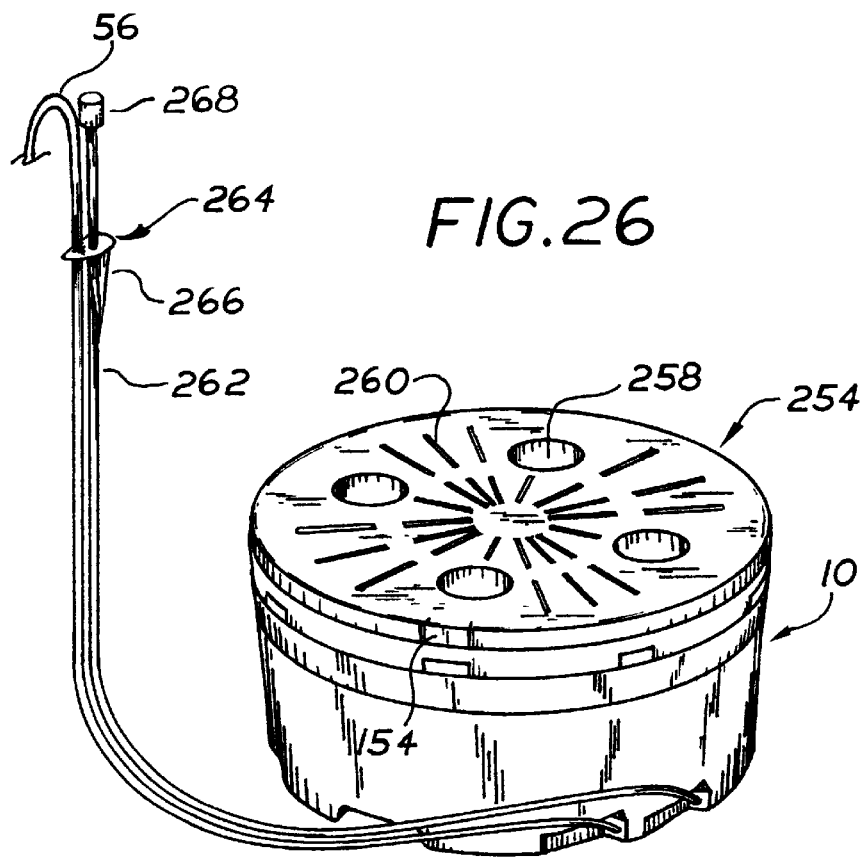
FIG. 26 is an perspective top view of the underground spring attached to the basin shown in FIG. 4.

The animal waterer attachment 222 for the basin 10 creates a water dish for automatic watering of virtually any animal. Many different sizes, styles and attachments can make the watering application more specific, for example the square waterer 248 and the rectangular waterer 250 in FIG. 25 show waterer embodiments with food handling accessories while the square waterer 234 and rectangular waterer 236 are shown without accessories. The user places the waterer 222 onto the basin 10 by matching the waterer seating rim 224 and the basin attachment seating rim 74 and rotating the attachment until the two opposing waterer latches 152 engage the basin vent/latch ports 70. The waterer attachment 222 snaps on to and off the basin 10 and has an integrally molded valve cover 228 to protect the valve 14 and an integrally molded snorkel clearance channel 230 to protect the basin snorkel body 26 assembly. The waterer 222 has water slots 232 through the horizontal surfaces of the attachment which allow water circulation. The entire interior surface is smooth so as to be 'tongue safe', and also easily cleaned. The basin drain discharge line 60 can also be attached and regulated with an in-line micro-drain regulating valve 62 to drip water to another site (e.g. a planter or tree) thus allowing the user regulated, constant replacement of the water in the waterer. When the waterer 222 is supplied by typical municipal chlorinated water, the waterer could, in its optimum configuration (with regulated drain), function perpetually with little or no maintenance. Water consumption rates, location and other variables have an affect on the maintenance requirements, however the unit would able to be left for extended periods of time without attention. The waterer attachment 222 food accessory 238 slips onto the edge of the waterer using the food accessory seating rim 240 around its 180 degree circumference. Food 244 is protected from splashing water by the food accessory splash guard 242 that divides the waterer attachment 222. For longer term food storage the bulk food container 246 accessory for the food accessory will hold and dispense food for longer periods of time.

Underground Spring Attachment

Figure 27:
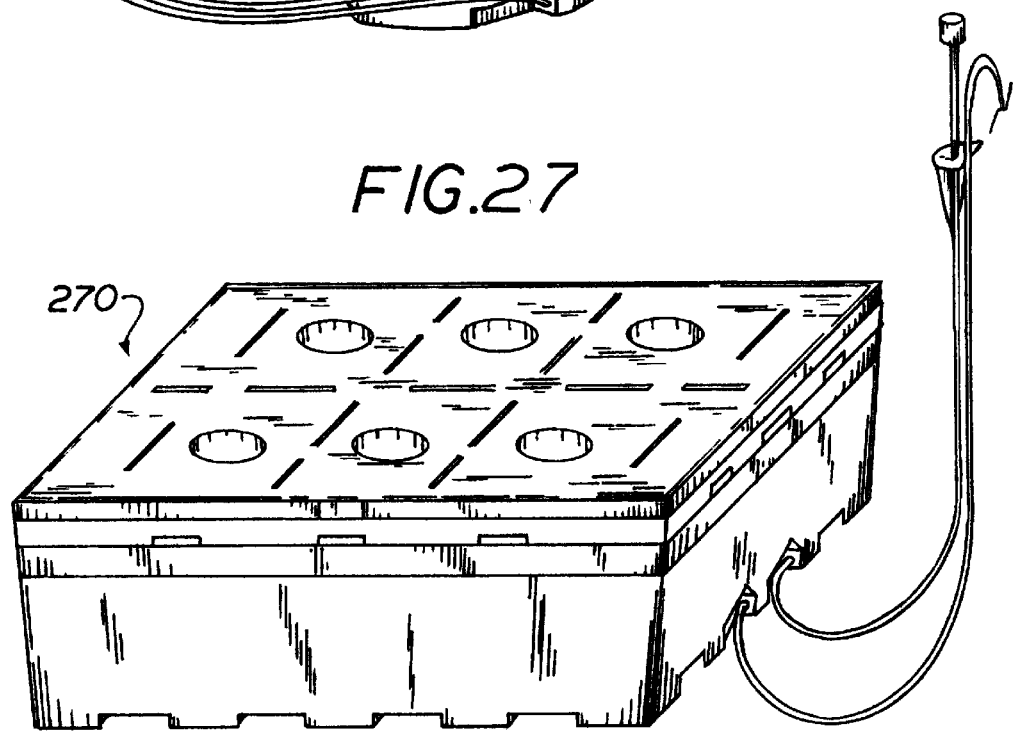
FIG. 27 is an perspective top view the rectangular embodiment of the underground spring as shown in FIG. 26.
Figure 28:
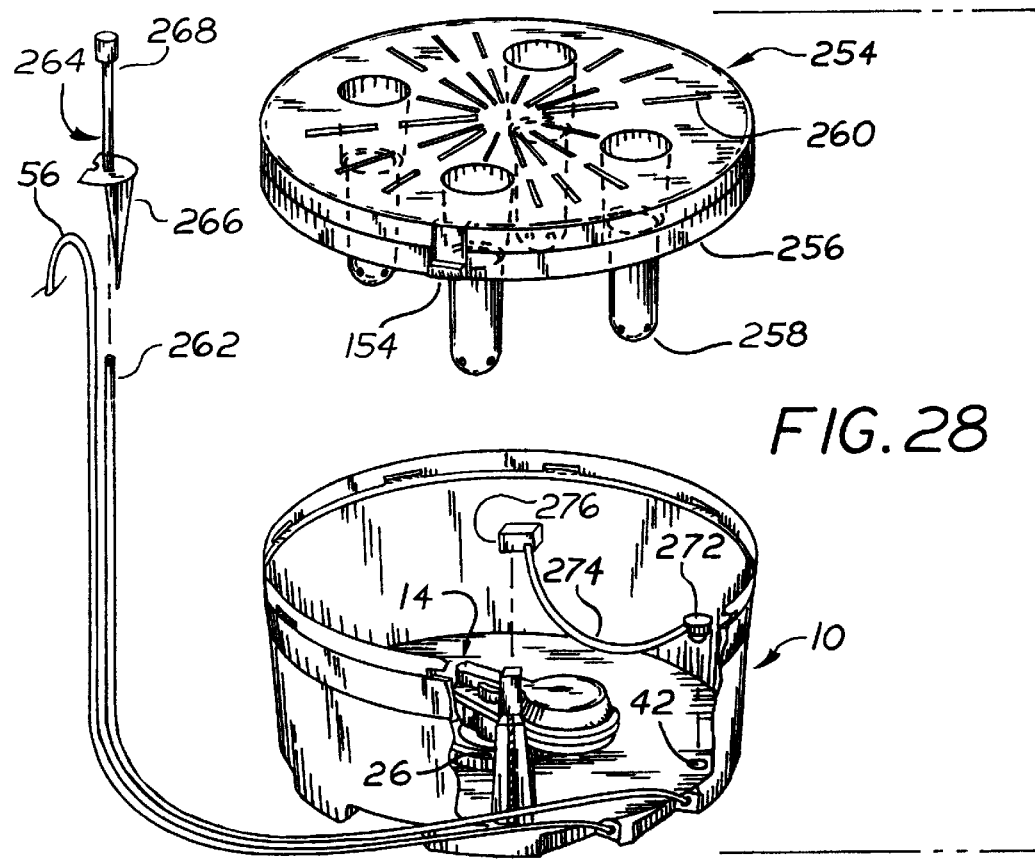
FIG. 28 is a perspective exploded view of the underground spring shown in FIG. 26.
Figure 29:
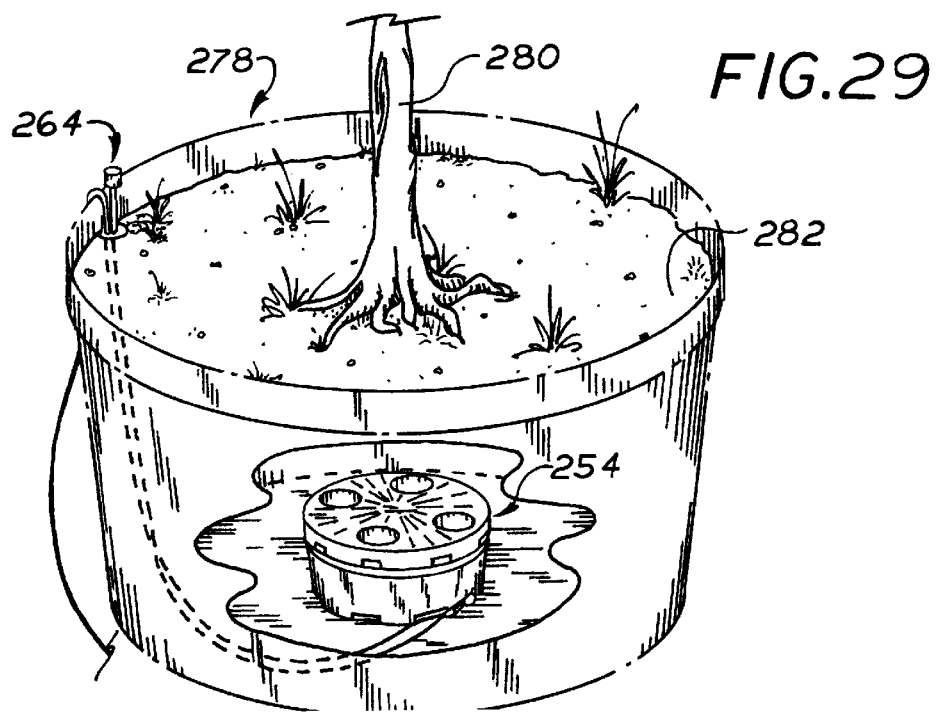
FIG. 29 is an perspective cutaway view of the underground spring as shown in FIG. 26 in a large planter with tree.
Figure 30:
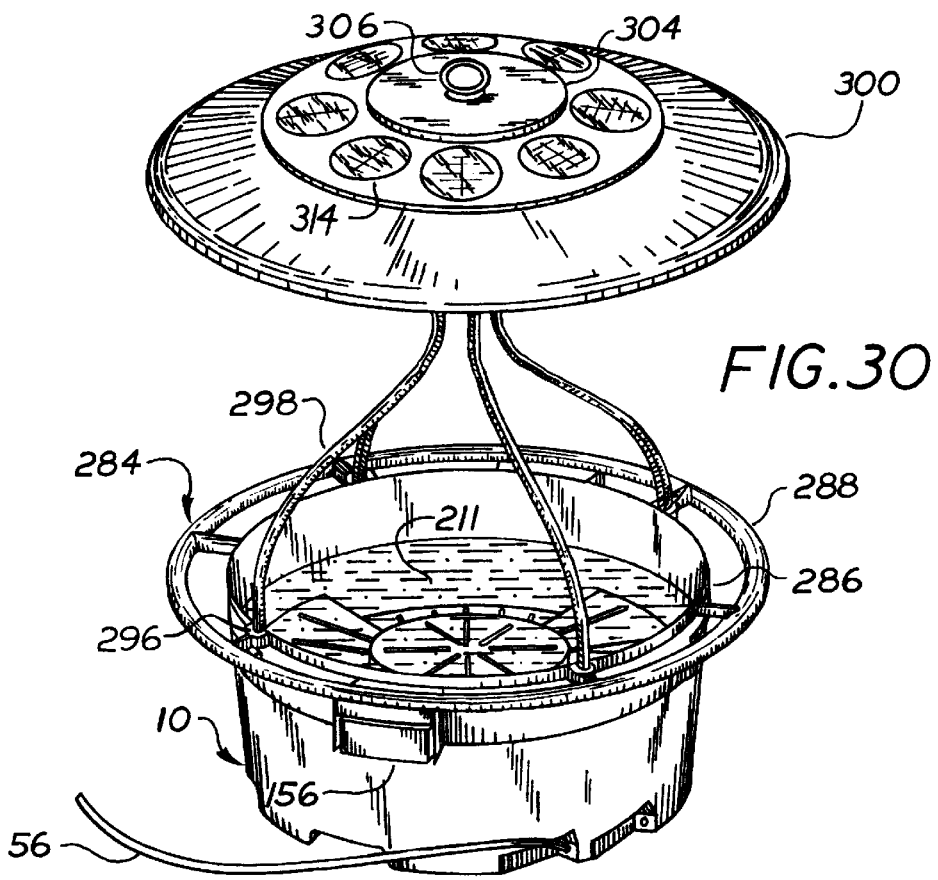
FIG. 30 is an perspective top view of the bird bath and umbrella assembly attached to the basin shown in FIG. 4.

The underground spring attachment 254 for the basin 10 creates an implantable water 211 source for plants particularly suited for large planters and also placement in the earth under valuable trees and shrubs, etc. The basin 10 is first modified by removing the snorkel cap 24 and replacing it with the basin snorkel air adapter cap 276 which is connected by the basin air adapter hose 274 to the basin drain port air adapter 272 that fits into the internal basin drain line port 42. The correct installation of the air adapter assembly (276, 274, and 272) will port ambient air to and from the valve 14 using the external drain line port 38 as the air channel to the atmosphere. The user places the underground spring attachment 254 onto the basin 10 by matching the underground spring seating rim 256 and the basin attachment seating rim 74 and rotating the attachment until the two opposing underground spring latches 154 engage the basin vent/latch ports 70. The underground spring air line 262 is then connected to the external drain line port 38 and the water delivery line 56 is connected to the basin external water line port 18 and both air and water lines run up and out of either the hole dug in the ground or the walls of the large planter where the spring 254 is located. The underground spring air line 262 is then connected to the external snorkel 264 and snorkel screen 268 and the support stake 266 and either stuck in the edge of the planter or in the ground near the plant once it has been planted on top of the underground spring. The user may also option to attach the external snorkel 264 to the plant itself especially if it is a tree 280 as this will prevent possible damage to a ground based snorkel. When the assembly of the underground spring 254 is complete the user fills the dirt or media wicks 258 with dirt or other desired media and places the spring in the bottom of the hole or an ordinary large planter 278. Quality dirt 282 is then distributed around and on top of the spring to a depth determined by the nature of the plant being supported and the needs of the user at which point the plant can be put in place and planting finished. The wicks 258 will move water 211 upward into the plant root ball which in turn will grow down into the underground spring wicks 258 and underground spring vent slots 260. After a few years when the tree roots have overwhelmed the spring 254 it can be shut down and the air and water lines cut off. The underground spring 254 could significantly enhance the survivability of valuable ornamental and fruit trees and would theoretically increase vegetative growth rates and fruit yields especially if fertilizers are fed into the underground spring in the water 211 stream. Many different sizes and styles of underground spring 254 could be made to meet different requirements with one example being the rectangular underground spring 270 shown in FIG. 27 which could provide automatic watering for large planters in malls, restaurants and other commercial facilities.

Bird Bath Attachment

Figure 31:
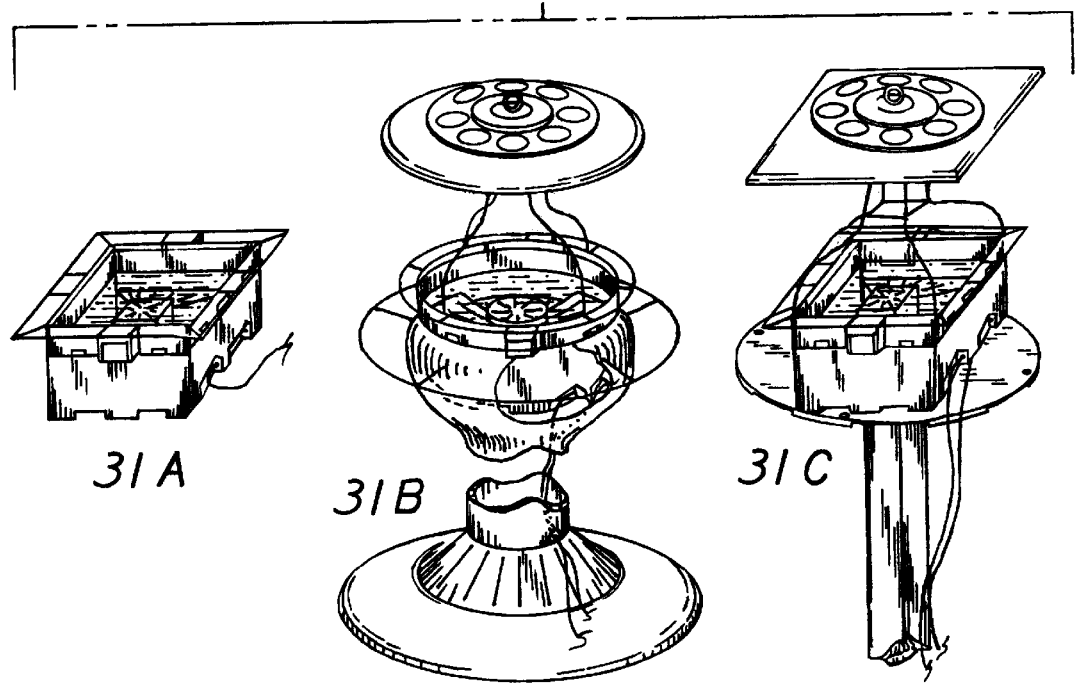
FIG. 31A is a perspective view of the square embodiment of the bird bath attachment as shown in FIG. 30.
FIG. 31B is a perspective view of the bird bath attachment shown in FIG. 30 mounted on and within a typical masonry bird bath pedestal.
FIG. 31C is an perspective view of the square embodiment of the bird bath attachment as shown in FIG. 31A mounted on a post.
Figure 32:
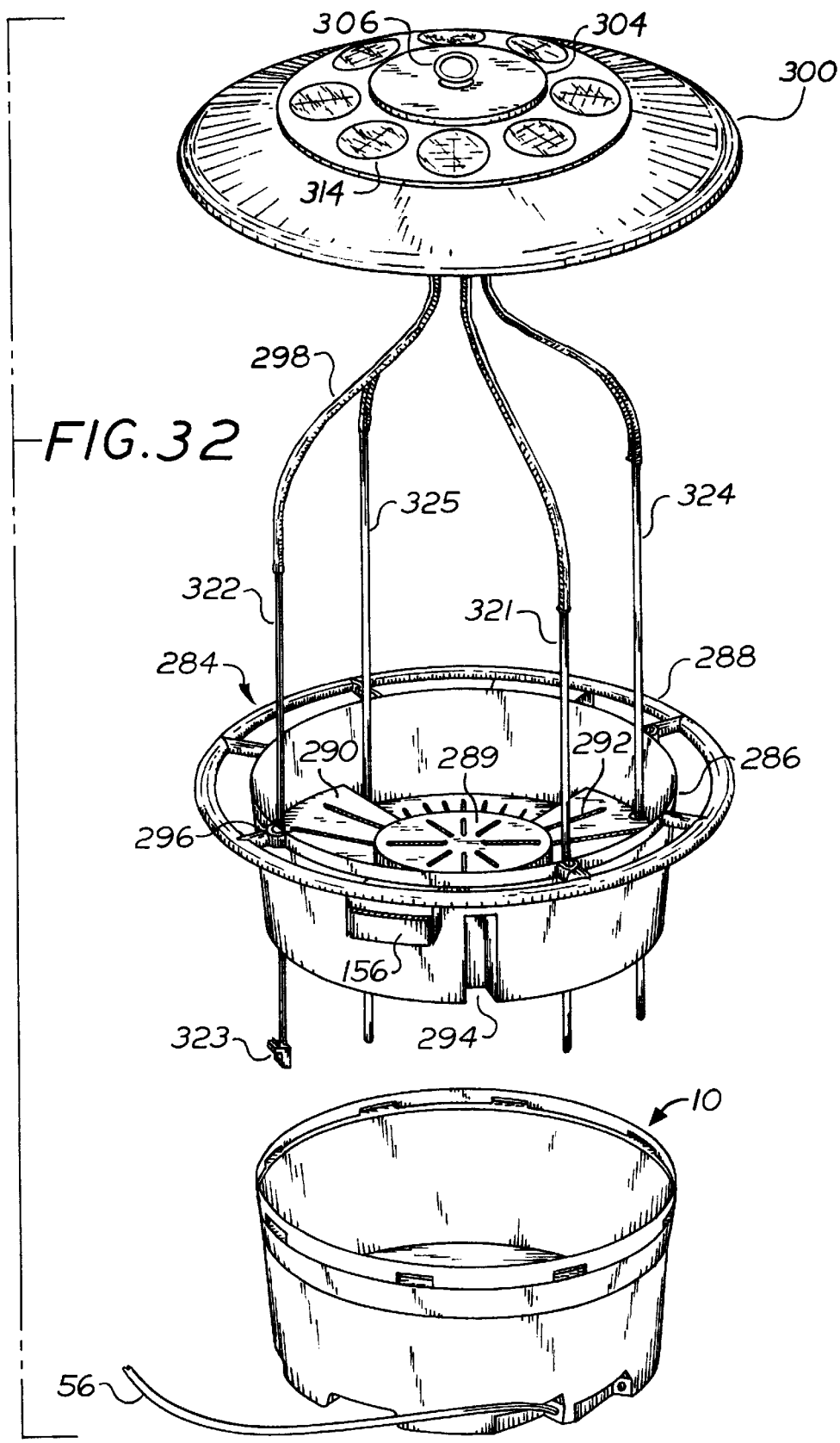
FIG. 32 is a perspective exploded view of the bird bath and umbrella assembly shown in FIG. 30 with optional solar powered bird shower.
Figure 33:
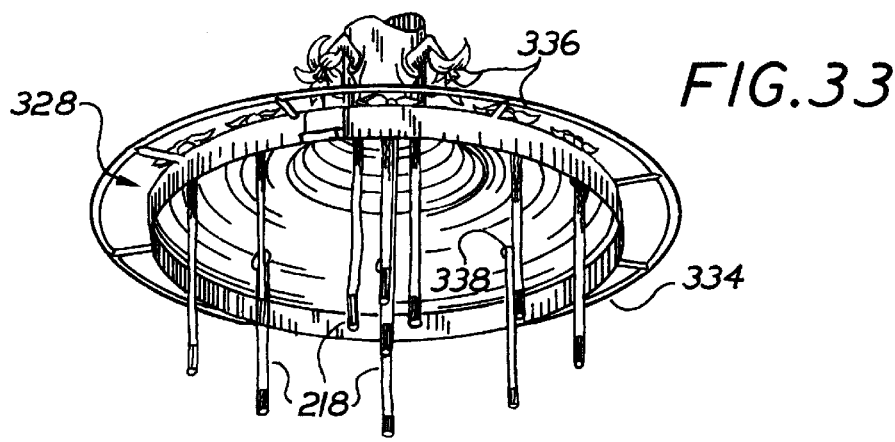
FIG. 33 is a perspective bottom view of the hummingbird feeder attachment for the basin in FIG. 4.
Figure 34:
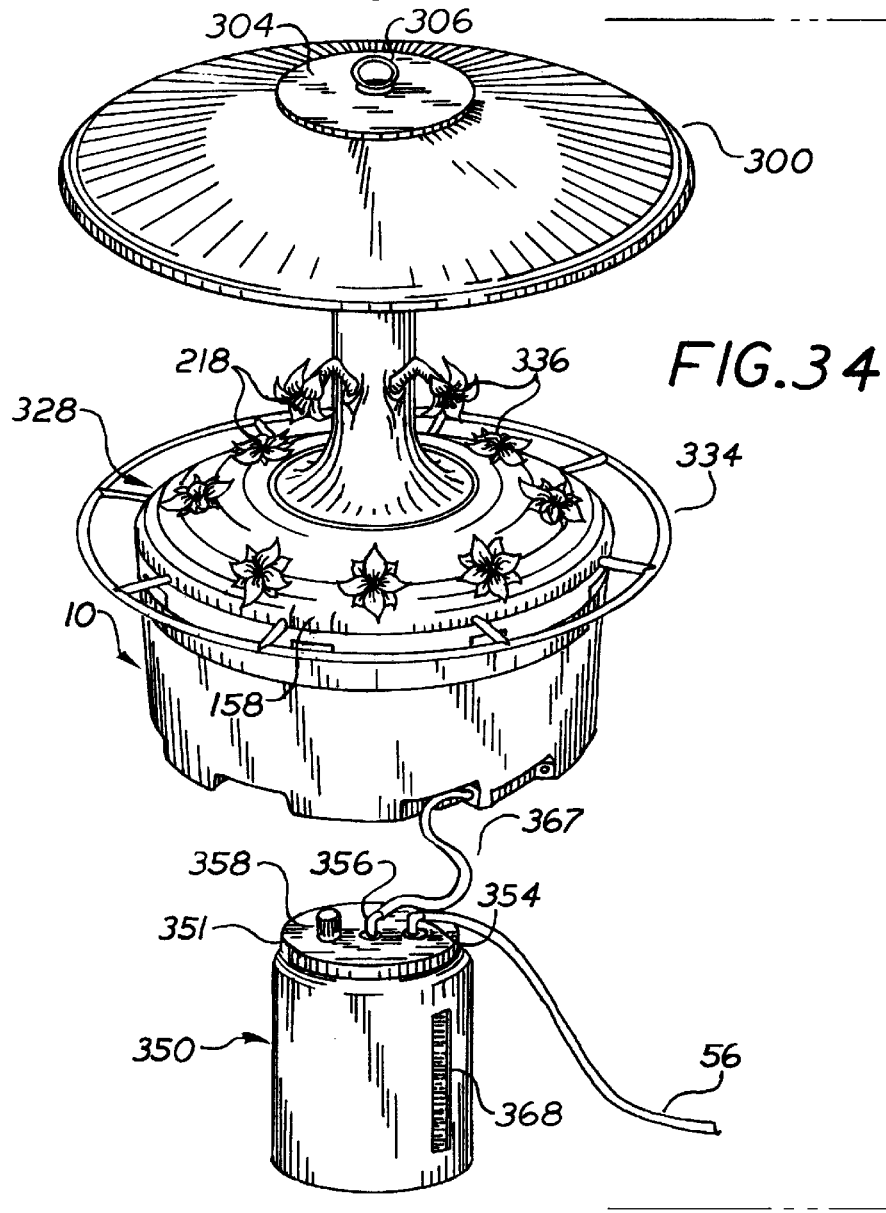
FIG. 34 is a perspective top view of the hummingbird feeder and umbrella assembly attached to the basin as shown in FIG. 4 with food solution bladder storage and pressure unit.
Figure 35:
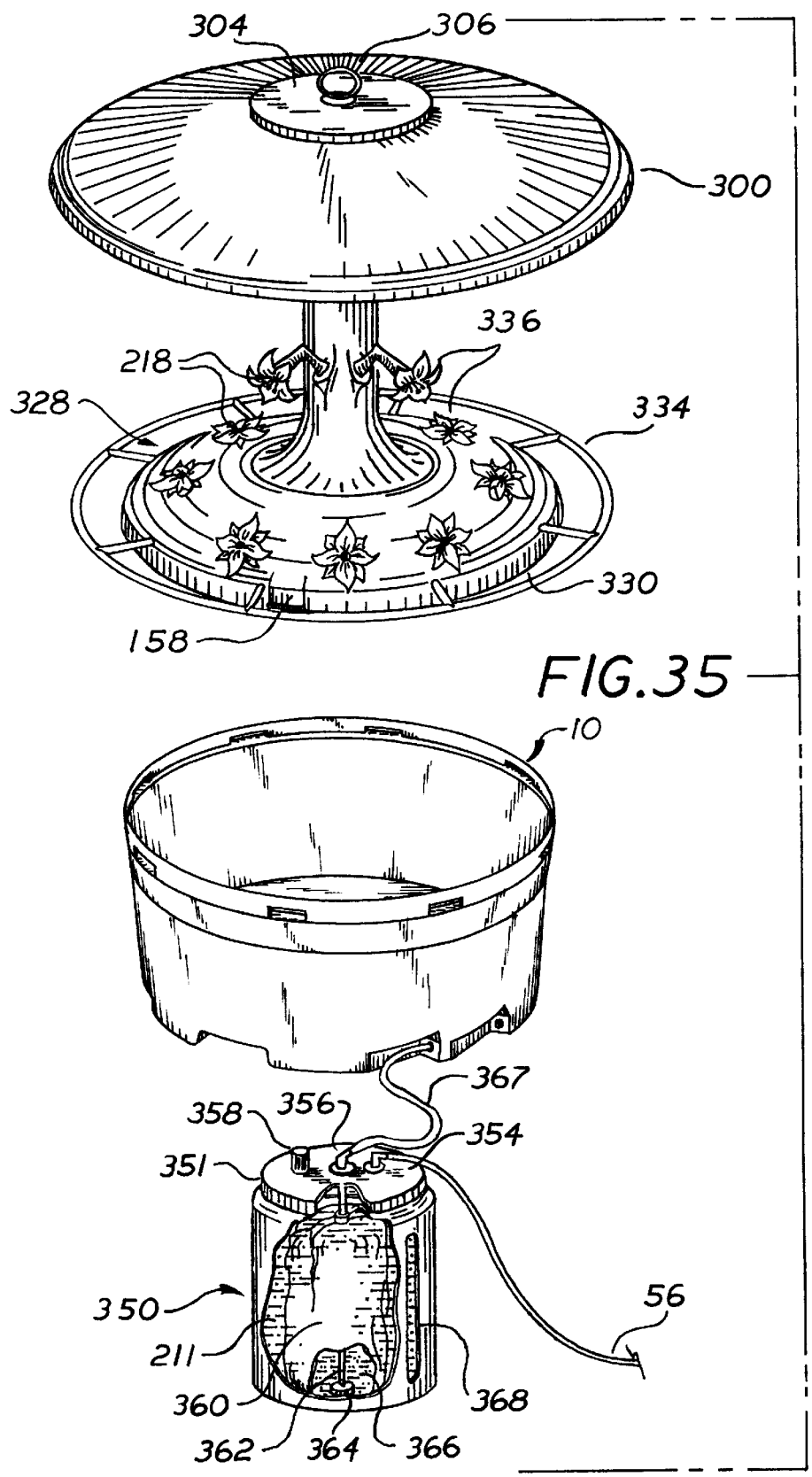
FIG. 35 is a perspective exploded view of the hummingbird feeder shown in FIG. 34.
Figure 39:
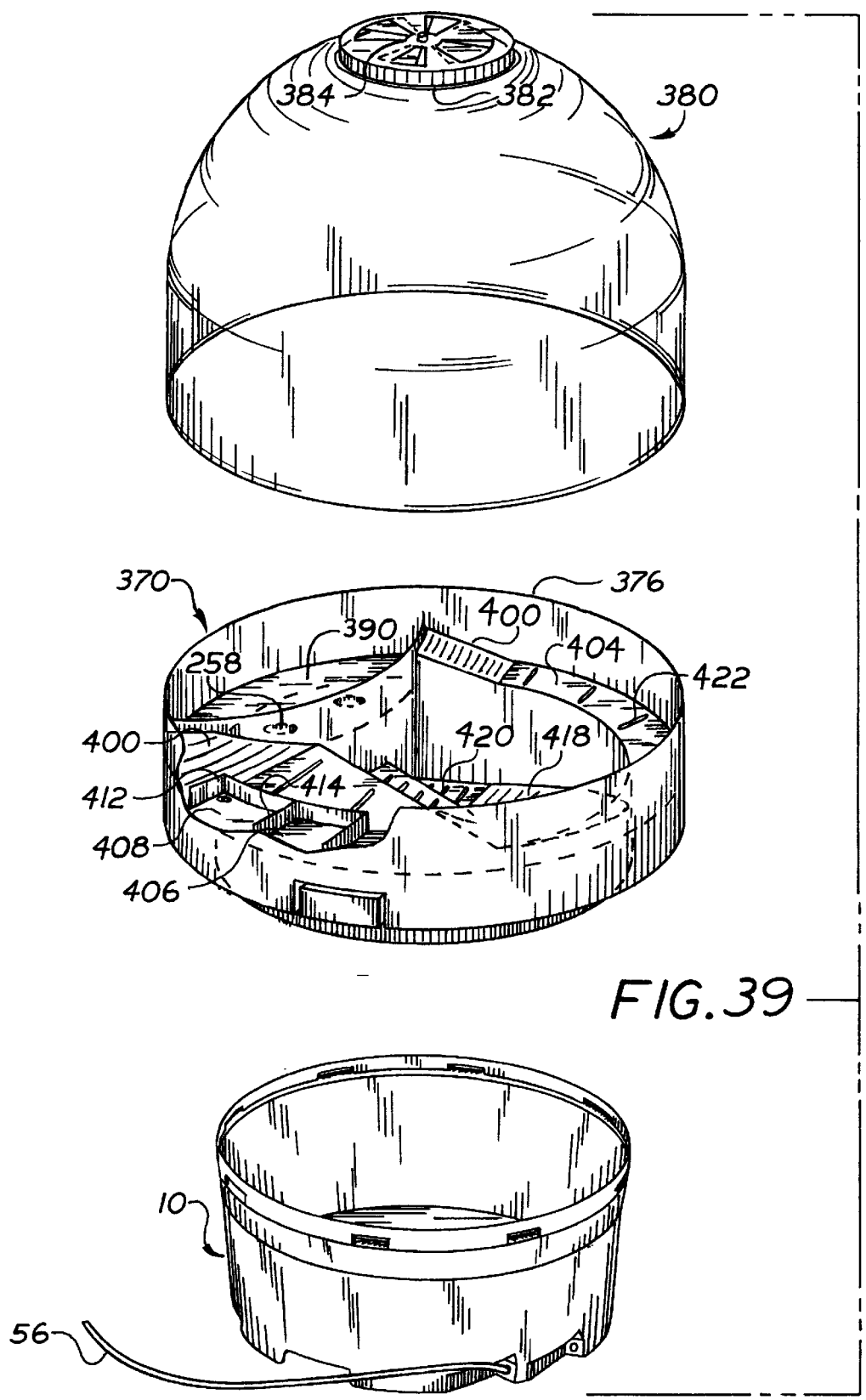
FIG. 39 is a perspective exploded view of the amphibian habitat shown in FIG. 37.
Figure 43:
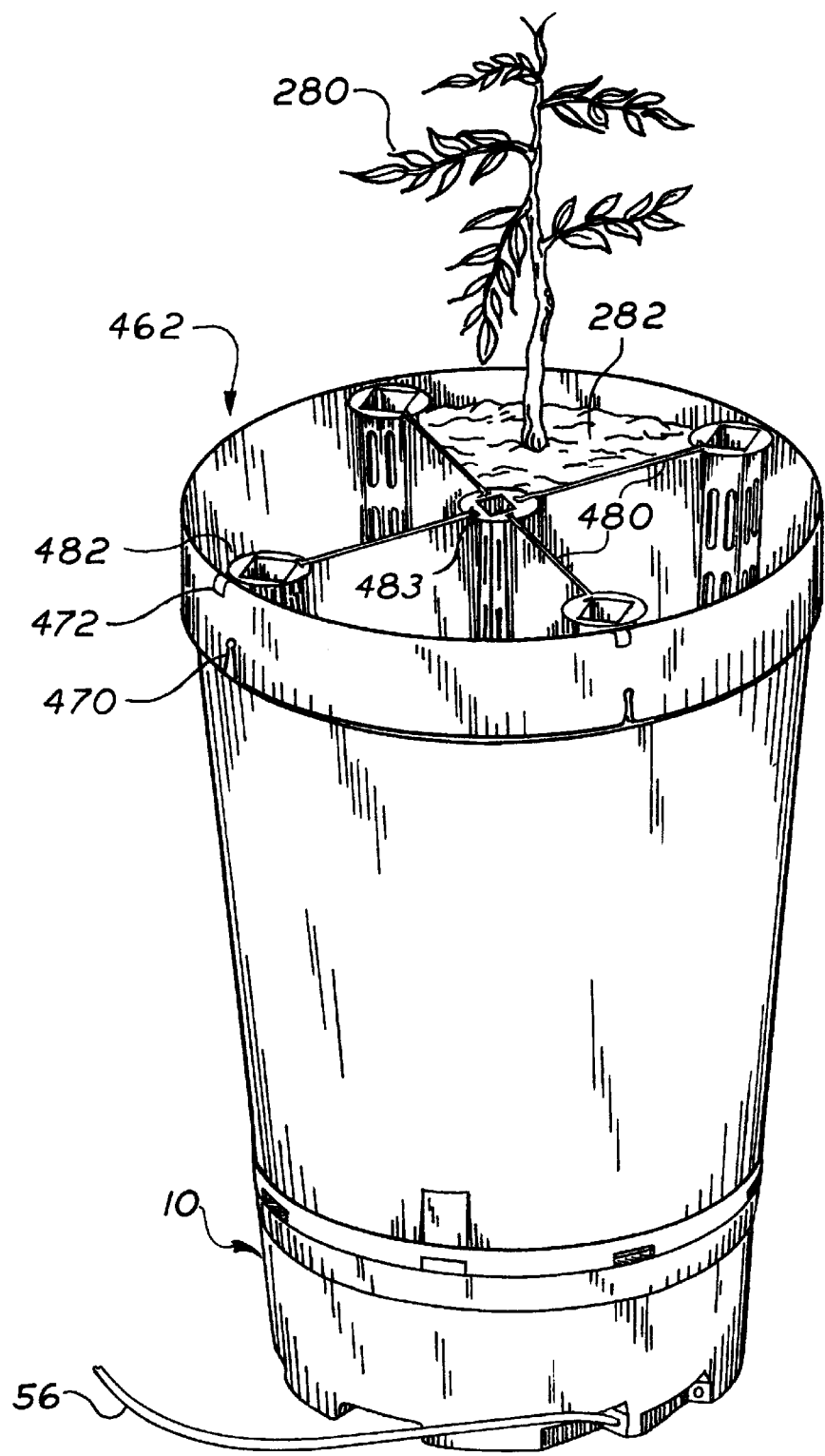
FIG. 43 is a perspective top view of the gardener attachment seated to the basin as shown in FIG. 4 with optional dividers and aerating root pruners.

The bird bath attachment 284 for the basin 10 creates a truly automatic bird bath that does not need refilling by the user and can be easily cleaned. The user places the bird bath attachment 284 onto the basin 10 by matching the bird bath seating rim 286 and the basin attachment seating rim 74 and rotating the attachment until the two opposing bird bath latches 156 engage the basin vent/latch ports 70. Birds may land on the bird bath perch 288 surrounding the bird bath 284 and then jump to the platform/valve cover 289 in the center and descend into the multi level bath floor 290 equipped with bird bath water slots 292 that serve the dual purpose of allowing free passage and circulation of water 211 and also create excellent gripping surface for the birds feet. The stepped and vented platform descends around the valve 14 and past the bird bath snorkel clearance channel 294 allowing birds to select the depth of water 211 within which they wish to bathe. The bird bath umbrella and accessory supports 298 snap into the support sockets 296 and provide a means for hanging the bird bath 284 and for supporting the optional bird bath umbrella 300 and its reinforcing disc 304 which are all hung from the hanging ring 306. To prevent water 211 fouling and stagnation the user may clean the unit easily and it will refill itself, or for even longer periods between cleaning the user may attach a drain regulating valve 62 controlled line to the basin external drain line port 38 and drip water 211 to a neighboring planter, bush, tree, etc. Slowly feeding the typical clorinated municipal water 211 through the bird bath 284 will help to control algae, fouling and stagnation and keep a far fresher water 211 for the birds to bathe in and drink. The bird bath attachment 284 could be made in many different sizes and styles such as the square bird bath 308, the bird bath pedestal embodiment 310 and the bird bath post mount embodiment 312 shown in FIG. 31. An additional option for the bird bath 284 is the bird shower accessory which comprises a shower head 320 suspended from the center of the bird bath umbrella and accessory supports 298 and fed through the shower supply line 321 which is supplied by the optional submersible water pump 138. The water pump 138 is powered by solar panels 314 mounted on the umbrella 300 with the solar cell output line 322 running down one of the umbrella and accessory supports 298 where the line terminates at the waterproof solar cell output line connector 323 which is connected to the submersible water pump 138. Whenever the solar panel 314 covered umbrella 300 is exposed to sunlight of sufficient strength (to trigger a voltage sensor and relay) the pump 138 would operate continuously and create the bird shower.

Hummingbird Feeder Attachment

The hummingbird feeder attachment 328 (feeder) for the basin 10 allows the user to feed hummingbirds with a safe, and when combined with the pressure bladder 348, a continuous supply of sterile hummingbird food solution 366.

The feeder 328, when used manually and without the pressure bladder 348 has a large reservoir for storing feeding solution 366 which when exhausted is replaced by the user. The hummingbird solution 366 is fed from the basin 10 through wicks 187 and 188 to the artificial flowers 336 located around the top of the bottom portion and the stem of the feeder attachment 328. A hummingbird perch 334 surrounds the feeder 328 and an optional umbrella 300 will provide shade and can be colored to attract hummingbirds. The user places the hummingbird feeder attachment 328 onto the basin 10 by matching the hummingbird feeder seating rim 330 and the basin attachment seating rim 74 and rotating the attachment until the two opposing hummingbird bath latches 158 engage the basin vent/latch ports 70. The assembled feeder 328 can be placed on surfaces, attached to surfaces or hung. In combination with the pressure bladder 348 the hummingbird feeder 328 becomes a true self feeding system capable of very long operation without requiring user refilling or maintenance. Two inherent weaknesses in existing hummingbird feeders are eliminated by the pressure bladder/feeder 328 combination. The first, and very often fatal (to the bird) flaw is the loss of food supply. Existing feeders have small reservoirs of food and are prone to run out of solution unless dutifully refilled by the human user. Birds that become dependent on the feeders will often die if the supply is cut off due to human error, laziness, vacation or any reason that stops the continuous refilling. Also, feeders that have larger reservoirs to try to compensate for the prior flare run into the equally difficult problem of airborne yeast contamination which will render the solution alcoholic and unpalatable to the birds, again cutting of the supply. The feeder/pressure bladder 328 combination allows the human user to store many gallons (if desired) of solution 366 in a sterile flexible opaque solution bag 360 that is inside the pressure bladder vessel 350 which in turn is fed by water 211 through a pressurized water delivery line 56 entering the vessel 350 through the bladder water line fitting 354 located on the bladder vessel cap 351. After trapped air is exhausted using the air pressure relief valve 358, the water 211 applies equal pressure around the solution bag 360 thereby forcing solution 366 through the collection tube screen 364 and up into the collection tube 362 and out of the solution bag 360 through the bladder solution line fitting 356 and then through the solution line 367 to the basin 10. The wicks 187 or 188 are inserted into the feeder attachment wick holes 338 and down into the solution 366 within the basin 10. The user may check the inventory of food solution 366 through the vessel sight glass 368. The hummingbird feeder 328 when operated automatically effectively eliminates the problem of interrupted food supply, plus the sealed container and delivery system substantially reduces the contamination problem. Accessory flowers (not shown) that match regional flowers and would be more specific to the hummingbirds being attracted, could replace the standard flowers. Also different flowers could be placed around the feeder and the user could watch and determine which flowers best appeal to the birds they wish to attract.

Amphibian Habitat Attachment

The amphibian attachment 370 (habitat) for the basin 10 creates a truly automatic amphibian habitat that does not need refilling by the user and can be easily cleaned. The user places the habitat attachment 370 onto the basin 10 by matching the habitat seating rim 372 and the basin attachment seating rim 74 and rotating the attachment until the two opposing habitat latches 160 engage the basin vent/latch ports 70. Turtles, salamanders, newts and other amphibians may travel around the habitat and encounter a plant area 390 filled with plants 388 appropriate for the species supported and then descend the plant area ramps 400 and on to the inner deck 404 where the food bowl 406 and water bowl 408 are located. The habitat 370 is equipped with a water pool with pool vent slots 420 that serve the dual purpose of allowing free passage and circulation of water 211 and also create excellent gripping surface for the amphibians. The pool floor 418 with its stepped and vented platform descends around and over the valve 14 allowing amphibians to select the depth of water 211 they want. The amphibian rim top 376 accepts the clear plastic dome 380 that can cover the habitat 370 to keep the amphibians in and the worst of the elements out. The dome 380 is equipped with an air dome vent 382 that ventilates the habitat 370 and is controlled by the dome vent adjustment knob 384. The dome 380 can also have the optional dome light 386 to supply light for all the life forms contained in the habitat 370 and to light the habitat for the user. Habitat 370 air is moved upward by convection currents from the amphibian attachment ventilation slots 422 and through the dome vent 382 and out of the habitat. To prevent water 211 fouling and stagnation the user may clean the unit easily and it will refill itself, or for even longer periods between cleaning the user may attach a drain regulating valve 62 controlled line to the basin external drain line port 38 and drip water 211 to a neighboring drain planter, bush, tree, etc. Slowly feeding the typical chlorinated municipal water 211 through the habitat 370 will help to control algae, fouling and stagnation and keep a far fresher water 211 for the amphibians.

The amphibian attachment 370 could be made in many different sizes and styles such as the square habitat 424 and the rectangular embodiment 426 shown in FIG. 38. The habitat 370 has a fresh water bowl 408 drinking water station and a food bowl 406 molded into the structure of the attachment that could have matching removable liners to facilitate cleaning and replacement of food and water without removing the attachment.

Animal/Bird Cage Attachment

The animal/bird cage attachment 428 (cage) for the basin 10 creates a small animal or bird cage that contains within it a fresh water bowl 442 and a plant area 440. The user places the cage attachment 428 onto the basin 10 by matching the cage seating rim 430 and the basin attachment seating rim 74 and rotating the attachment until the two opposing cage latches 160 engage the basin vent/latch ports 70. The cage attachment rim 446 which circles the top edge of the attachment accepts the cage seating rim 450 upon it. By pulling the tray handle 434 the user can remove the sliding pull out tray 432 that covers most of the flat cage bottom 436. A food trough 438 can hold food for the animals housed within the cage 428. A cage hanging ring 456 allows the user to hang the cage attachment 428 and basin 10 combination by connecting the ring to the top of the wire cage 448. The interior of the wire cage 448 is accessed through the hinged cage door 454. The cage attachment 428 could be made in many different sizes and styles such as the square cage 458 and the rectangular cage 460 shown in FIG. 41.

Gardener Attachment

The gardener attachment 462 (gardener) for the basin 10 creates a multi-featured plant growing system. The user places the gardener attachment 462 onto the basin 10 by matching the gardener seating rim 464 and the basin attachment seating rim 74 and rotating the attachment until the two opposing gardener latches 162 engage the basin vent/latch ports 70. If the user wishes the latches 162 need not be engaged in the basin vent/latch ports 70 allowing the gardener attachment 462 to rotate on the basin attachment seating rim 74 and thus allow the user to select the air flow rates desired with the use of the bottom rim vent slots 466. The four dirt or media filled wicks/legs 258 drop from the gardener 462 into the water 211 in the basin 10. Capillary action draws the water 211 up and the plants osmotic action accelerates and regulates the water 211 flow.

The user, after connecting a water delivery line 56 to the Basin will not have to water 211 the plant again unless his water supply 58 is stopped. With the use of existing standard in-line fertilizing devices and using water soluble nutrients, the user can also automatically fertilize the plant.

Figure 45:
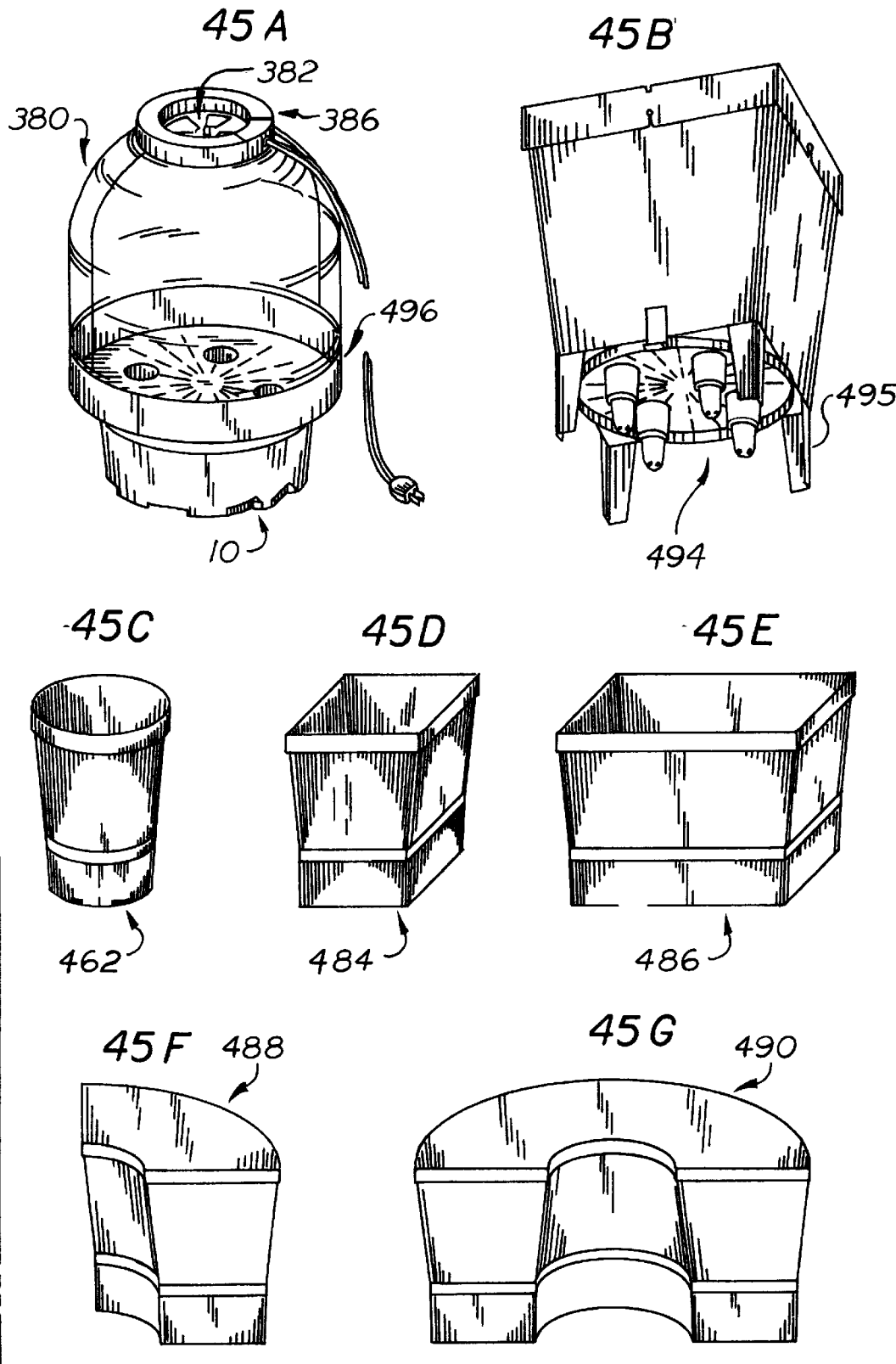
FIG. 45A is a perspective top view of the short wall, terrarium style embodiment of the gardener attachment for the basin as shown in FIG. 4.
FIG. 45B is a perspective bottom view of the square embodiment of the gardener attachment for the basin as shown in FIG. 4.
FIG. 45C is a perspective view on a reduced scale of the gardener attachment seated on the basin as shown in FIG. 43.
FIG. 45D is a perspective view of the square embodiment of the gardener as shown in FIG. 43.
FIG. 45E is a perspective view of the rectangular embodiment of the gardener as shown in FIG. 43.
FIG. 45F is a perspective view of the ¼ doughnut embodiment of the gardener as shown in FIG. 43.
FIG. 45G is a perspective view of the ½ doughnut embodiment of the gardener as shown in FIG. 43.
Figure 52:
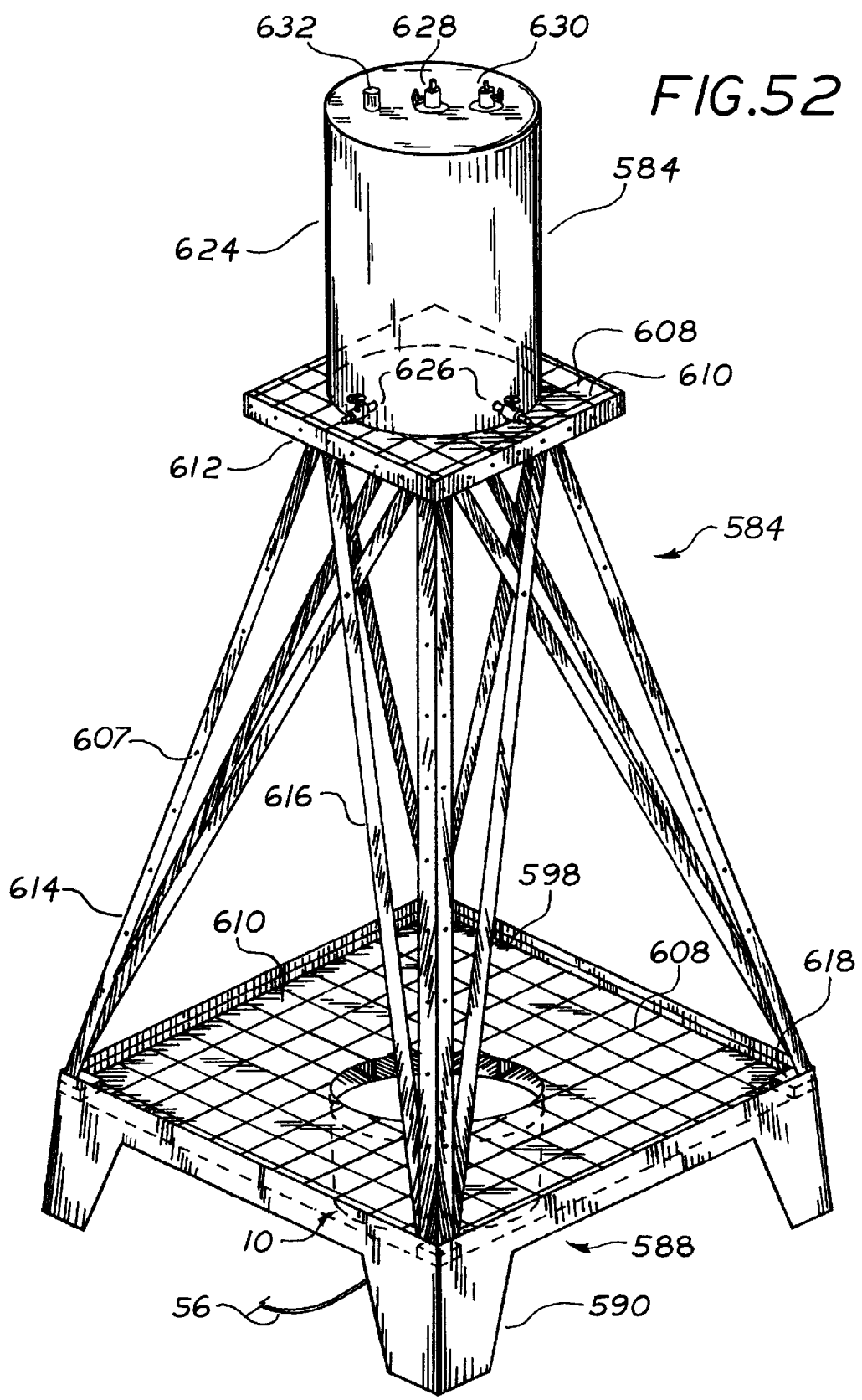
FIG. 52 is a perspective top view of the water toy attachment connected to the basin as shown in FIG. 4.

The gardener 462 can be made in many shapes and sizes some of which are shown in FIG. 45 and include but are not limited to: the square gardener 484, the rectangular gardener 486, the elbows shaped gardener 488, the ½ doughnut shaped gardener 490, the square gardener that fits round basins 494 and gardeners such as the short wall gardener 496 for use as terrariums, spice gardens and the like. The gardener 462 and basin 10 can be placed on surfaces, attached to surfaces or hung using the optional carry handle 576 or hangers 578 and hanger trellises 580 that slip into two of the multiple hanger keys 470 provided along the top rim 468 of the gardener 462. For ground based usage the gardener 462 rotates 360 degrees by lightly depressing the gardener latches 162 and rotating either direction. The dirt or media wicks/legs 258 extending below the gardener 462 rotate around the valve and miss the basin snorkel body 26. Vent slots 476 through the horizontal surfaces of the bottom of the gardener 462 allow air movement through the basin 10 and up through the gardener 462. The user may adjust the amount of air flow by rotating the gardener 462 to allow the desired vent gap.

The gardener 462 can be divided into 2, 3 or 4 sections using the reversible interlocking panel dividers 480 in half panel 477 or quarter panel 479 sections which snap into the slots 560 on the gardener floor 481 and the ARP divider locking slots 472 on the rim 468 and rest in the ARP/divider stabilizer channel 508 and hook on to the divider catch 556. The quarter divider 479 panel has a reversible center catch 558 to allow the quarter divider to be placed on the opposite side of the half panel 477. The dividers 480 completely separate the sections so that different plants with different requirements can all self water 211 and fertilize at their respective rates in different compartments of the same container. Plants can be started as seeds or seedlings and when their growth exceeds the size of their container they can be easily moved and transplanted.

The gardener 462 can be turned into an aerating root pruning (ARP) container by using one or more ARP inserts which have two versions, the aerating root pruner wall 482 version and a aerating root pruner column 483, center column version. The abandoned Air Root Pruning Container patent U.S. Pat. No. 4,510,712 is incorporated by reference in its entirety into this disclosure. The aerating root pruners 482 and 483 are tubular square vented tubes with wings 514 that snap into the ARP insertion knockouts 478 on the gardener floor 481. The wall version ARP's 482 seat into the gardener rim 468 using wall locking tabs 498 on their top out facing edge immediately opposite the divider slot 511 on the ARP head 500 through which passes the ARP top opening 504 which provides the conduit for air between the underside of the gardener floor 481 and the top openings 504, 522 of the the ARP's 482 and 483. Structural stability and sealing are provided by the stabilizing rib 506 that fits into the divider slots 511, and structural support is also lent by the divider stabilizer channel 508 that accepts the dividers 480. The column version of the ARP 483 sits in the center of the gardener 462 and is held in place by column locking tabs 524 that hold it to the floor 481. The column head 520 is used to pull the ARP out of the gardener and like the wall version air escapes the ARP column version through the column head opening 522. FIG. 50 shows the ARP center catch detail 562 and the side catch detail 564. The key component to the ARPs are the air slots 512 which do the pruning, the ARP wings 514 which steer roots into the ARP's 482 and 483. The ARP base 516 seals the area above the gardener floor while the ARP punch base 518 is tapered and sharp enough and strengthened by the ARP base 516 sufficiently to punch through the gardener floor 481. The ARP inserts 482 and 483 can also be used with their own set of reversible ARP interlocking divider panels 475 which are identical to the standard dividers 482 and 483 except narrower. The divider 475 hooks into and is held in place by the divider catch 510. When used in the preferred embodiment of the gardener attachment 462 there are 24 ARP directional surfaces available to the plant roots which far exceeds the original ARP patent of 8 ARP directional surfaces. Also the ARPs 482 and 483 function as an excellent aeration means for the gardener 462. The ARPs 482 and 483 and the dividers 475, 477 and 479 can be used in any combination desired. As roots grow into the ARP's 482 and 483 over time the user may wish to clean them out and may do so with the manual ARP cutter tool 526. The user grasps the tool by the cutter handle 528 and then positions the cutting edge 530 over the ARP 482 or 483 and pushes down thereby cutting the roots. Upon being pulled out of the ARPs 482 and 483 the interior extraction barbs 532 on the inside of the cutter 526 help grasp the cut roots and lift them out. The ARP 482 and 483 vacuum attachment 534 consisting of a vacuum adapter 536, vacuum attachment head 540, screen housing 542, vacuum screen 544, vacuum collector 546, vacuum neck 548, vacuum cutting nozzle 550 and the vacuum hose to vacuum 554 the entire assembly rendering a traditional vacuum unit into a portable unit the user can carry around to clean ARP's and especially in commercial situations, to quickly clean and extract material from inside the ARP's.

The gardener 462 can be made of clear plastic and covered with an opaque sleeve. This will allow the user to determine the extent of root binding and thereby optimize transplant timing and subsequently plant growth. Also various additional accessories such as gardener top covers 574, protective trays 572, detachable dome lighting 386, trellaces 580 and various carry handles 576 and hangers 578 fit the gardener 462.

The gardener 462 and basin 10 can also be combined with the bury bucket 566 to produce a unique ground level, self-maintaining planter. The user buries the bury bucket 566 to its rim, hangs the matching gardener 462 and connected basin 10 into it and connects it to water delivery line 56 through the ports provided along the the bury bucket upper rim. For arid and desert environments this would allow absolute water 211 control and conservation of water 211 used for plant purposes. For temperate climates it allows for quick removal of plants and their subsequent return in the event of cold temperatures. For commercial purposes it would allow replacement of overgrown or deprived plants rather than replanting and would be particularly useful in malls and other large buildings requiring intensive plant maintenance in light deprived environments. Both the gardener 462 and the bury bucket 566 stack and nest at less than 10% of their height which allows enhanced storage and shipping.

By mounting the optional heater 132 in the basin 10 and connecting the ARP equipped gardener 462, the user can create a frost resistant growing container. When used with the ARPs 482 and 483 the gardener 462 is able to port warm air from above the heated water 211 in the basin 10 and up through the gardener ARPs and up and around the plant foliage above. By slightly turning the gardener the user can adjust the basin vent/latch ports 70 to create the desired venturi effect and modify the airflow based on the depth of freeze anticipated. Of course, if it gets too cold the user can always pick the gardener 462 up without or without the basin 10 and move it to shelter.

Water Toy Attachment

The water toy attachment 584 (water toy) when attached to the basin 10 becomes a multi use water toy and educational tool. The user can build a series of chutes, slides, falls, hoses, wheels, lifts and an endless list of gadgets all of them powered or operated by the gravity fed water 211 from the upper tank 624 or a self contained recirculating submersible water pump 138. Similar in style to conceptual artist Rube Goldbergs creations, the user will have virtually unlimited potential for building different water powered devices and sculptures. For children the water toy 584 is a toy, for adults it is kinetic art.

The water toy 584 works as a platform for two existing very popular building toys; specifically the KNEX building system by Connector Set Toy Company and LEGO building blocks by LEGO Systems Inc. The KNEX and LEGO toys can be used to build on the platform or building tray 598. The toy would provide a water 211 oriented application of these two very popular toys.

The water toy 584 is made entirely of injection molded plastic and snaps together without the use of tools. The user places the toy attachment 584 onto the basin 10 by matching the water toy seating rim 586 and the basin attachment seating rim 74 and rotating the basin until the two opposing water toy latches 164 engage the basin vent/latch ports 70. The water toy base 588 is reinforced with reinforcing ribs 596 to strengthen it. The water toy 584 has base legs 590 as part of the base through which pass bolt holes 604 which accept the tower bolts 618 (4 each) to stabilize the water toy and tie the entire structure together, especially when it is covered with building hardware. In the center of the building tray 598 is the drainage hole 600 for water 211 to pass through into the basin 10. The building tray 598, and the entire tower 612, consisting of; tower legs 614, tower bracing 616 and water tower platform 620 are covered with 6.50 mm holes 607, 6.25 mm posts 606, 6.50 mm wells 608 and 4.50 mm relief studs 610 arranged in a pattern and designed to accept the KNEX and LEGO components. The wells 608 have on their bottom surfaces 2.00 mm drain holes 609 to allow the passage of water through them. The bottoms of the tower legs 614 have tower bolt holes 594 in them that the bolts 618 pass through the water toy base 588 to tie the unit firmly together.

Water 211 is delivered to the water toy 584 by pressurized water delivery line 56, through the valve 14 and up to the water/pressure tank 624 which is held in place by the platform tower seating rim 622. The user can activate a series of valves including the output valve 626, input valve 628 and water tank air supply 630 valve which has a matching air bleeder 632 to initiate operation of gravity fed and powered devices. As water 211 pours down the various devices it is collected by the water toy base 588 and redirected into the basin 10. The user can utilize an optional low voltage recirculating submersible water pump 138 to provide for continuous operation or can, during outdoor use, simply let the water overflow or be splashed around.

The water toy can be made in many different shapes and sizes and a virtually infinite number of accessories and toys can be made to fit or be used with the water toy.

List of Reference numbers

| | | | |
|---|---|---|---|
| 10 | basin (complete) | 76 | Basin stacking support |
| 12 | Utility bracket | 78 | Water level sight glass |
| 13 | Adjusting screw spring | 80 | Valve mounting flange |
| 14 | Fill valve | 82 | Retention tabs |
| 15 | Valve adjusting screw | 84 | Retention tab compression cam |
| 16 | basin body (without utility bracket) | 86 | Retention tab stop |
| 18 | External water line port | 88 | Water gasket trough |
| 20 | Water supply channel | 90 | Air gasket trough |
| 22 | Internal water port | 92 | Air trough |
| 24 | Snorkel cap | 94 | Gasket retention rings |
| 26 | Basin snorkel body | 96 | Water isolating gasket |
| 28 | Basin snorkel support rib | 98 | Air isolation gasket |
| 30 | Utility snorkel debris trap | 100 | Valve base |
| 32 | Utility snorkel | 101 | Valve base seating beads |
| 34 | Utility air channel | 104 | Valve base water port |
| 36 | Internal air port | 106 | Valve base air port |
| 38 | External drain line port | 108 | Valve base compression cam |
| 40 | Internal utility drain line port | | |
| 42 | Internal basin line port | 110 | Manual operation insertion plug finger key |
| 44 | Tear out drain line tab | | |
| 46 | Insert x thread fittings | 112 | Manual operation insertion plug finger key |
| 48 | Spring clamp | | |
| 50 | Quick disconnect fitting | 114 | Manual operation insertion plug cam |
| 54 | Quick disconnect with auto shut off | | |
| 56 | Water delivery line | 116 | Multiple basin insertion plug |
| 58 | Water supply | | |
| 60 | Drain discharge line | 118 | Multiple basin insertion plug water port |
| 62 | Drain regulating valve | 120 | Basin drain screen |
| 64 | Basin feet | 122 | Square basin |
| 66 | Basin feet/bottom reinforcing ribs | 124 | Rectangular basin |
| | | 126 | Doughnut basin |
| 68 | Basin hold-down tabs | 128 | Semi-circle basin |
| 69 | Utility access cutouts | 130 | Corner basin |
| 70 | Basin vent/latch ports | 132 | Heater |
| 72 | Basin rim | 134 | Heater male electrical terminals |
| 74 | Attachment seating rim | | |
| 144 | Pump plug and cord | 136 | Heater plug and cord |
| 146 | Pump mounting tabs | 138 | Submersible water pump |
| 150 | Pot converter latch | 140 | Pump water outlet |
| 152 | Animal waterer latch | 142 | Water pump male electrical terminals |
| 154 | Underground spring latch | | |
| 156 | Bird batch latch | 212 | Polyester/nylon wicking material |
| 158 | Hummingbird feeder latch | | |
| 160 | Habitat/cage latch | 214 | Rolled wick |
| 162 | Gardener latch | 216 | Expanding membrane wrapped wick |
| 164 | Water toy latch | | |
| 166 | Pot converter attachment | 218 | Wick wrapping in impermeable cover |
| 168 | Pot converter seating rim | | |
| 170 | Pot converter vent slots | 220 | Quick wick cross section |
| 172 | Pot converter upper rim | 222 | Animal waterer attachment |
| 174 | Pot converter wick holes | 224 | Waterer attachment seating rim |
| 176 | Pot converter drainage elevation ribs | | |
| | | 228 | Waterer valve cover |
| 178 | Pot converter support ribs | 230 | Waterer snorkel clearance channel |
| 180 | Ordinary plant pot | | |
| 182 | Ordinary wicks | 232 | Waterer water slots |
| 184 | Square pot converter | 234 | Waterer floor |
| 186 | Rectangular pot converter | 238 | Waterer food accessory |
| 187 | Quick wick with removable sleeve | 240 | Food accessory seating rim |
| | | 242 | Food accessory splash guard |
| 188 | Quick wick with dissolving sleeve | | |
| | | 244 | Animal food |
| 190 | Removable sleeve | 246 | Bulk food container |
| 192 | Removable sleeve head slits | 254 | Underground spring attach- |

List of Reference numbers

| | | | |
|---|---|---|---|
| 193 | Removable sleeve grip | | ment |
| 194 | Quick wick impermeable cover | 256 | Underground spring seating rim |
| 196 | Quick wick expanding sleeve | 258 | Dirt or media wicks |
| 198 | Dissolving sleeve | 260 | Underground spring vent slots |
| 204 | Dissolving sleeve tip hole | | |
| 206 | Quick wick dissolving right angle | 262 | Underground spring air line |
| | | 264 | External snorkel |
| 208 | Quick wick dissolving head at insertion | 266 | Support stake |
| | | 268 | External snorkel screen |
| 210 | Quick wick dissolving head after expansion | 270 | Rectangular underground spring |
| 211 | Water | 272 | Basin drain port air adapter |
| 292 | Bird bath water slots | 274 | Basin air adapter hose |
| 294 | Bird bath snorkel clearance channel | 276 | Basin snorkel air adapter cap |
| 296 | Support socket | 278 | Ordinary large planter |
| 298 | Umbrella and accessory support | 280 | Tree |
| | | 282 | Dirt |
| 300 | Bird bath umbrella | 284 | Bird bath attachment |
| 304 | Umbrella reinforcing disc | 286 | Bird bath seating rim |
| 306 | Hanging ring | 288 | Bird bath perch |
| 314 | Solar panels | 289 | Platform/valve cover |
| 320 | Shower head | 290 | Multi-level bath floor |
| 321 | Shower supply line | 390 | Plant area |
| 322 | Solar cell output line | 400 | Plant area ramps |
| 323 | Solar cell output line connector | 404 | Inner deck |
| | | 406 | Amphibian food bowl |
| 328 | Hummingbird feeder attachment | 408 | Amphibian water bowl |
| | | 418 | Amphibian pool floor |
| 330 | Hummingbird seating rim | 420 | Amphibian pool vent slots |
| 334 | Hummingbird perch | 422 | Amphibian ventilation slots |
| 336 | Artificial flower | 428 | Animal/bird cage attachment |
| 338 | Hummingbird wick hole | | |
| 350 | Pressure bladder vessel | 432 | Pull out tray |
| 351 | Bladder vessel cap | 434 | Pull out tray handle |
| 354 | Bladder water line fitting | 436 | Cage bottom |
| 356 | Bladder solution line fitting | 438 | Cage food trough |
| 358 | Bladder air pressure relief valve | 440 | Cage plant area |
| | | 442 | Cage water bowl |
| 360 | Food solution bag | 446 | Cage attachment rim |
| 362 | Collection tube | 448 | Wire cage |
| 364 | Collection tube screen | 450 | Cage seating rim |
| 366 | Hummingbird food solution | 454 | Cage door |
| 367 | Food solution line | 456 | Cage hanging ring |
| 368 | Vessel sight glass | 462 | Gardener attachment |
| 370 | Amphibian attachment | 464 | Gardener seating rim |
| 372 | Amphibian seating rim | 466 | Gardener bottom rim vent slots |
| 376 | Amphibian rim top | | |
| 380 | Dome | 468 | Gardener top rim |
| 382 | Dome vent | 470 | Hanger keys |
| 384 | Dome vent adjustment knob | 472 | ARP/divider locking slot |
| 386 | Light | 475 | ARP/interlocking divider panels |
| 388 | Plants | | |
| 486 | Rectangular gardener | 476 | Vent slots on gardener bottom |
| 488 | ¼ doughnut shaped gardener | | |
| 490 | ½ doughnut gardener | 477 | Half panel divider |
| 494 | Square gardener that fits round basin | 478 | ARP insertion knockouts |
| | | 479 | Quarter panel divider |
| 495 | Square gardener legs | 480 | Gardener dividers |
| 496 | Short wall gardener | 481 | Gardener floor |
| 498 | ARP wall locking tab | 482 | Aerating root pruners-wall |
| 500 | ARP head-wall | 483 | Aerating root pruners-column |
| 504 | ARP-wall head opening | | |
| 506 | ARP-wall stabilizing rib | 484 | Square gardener |
| 508 | ARP divider stabilizer channel | 560 | Divider air slot tabs |
| 510 | ARP wall divider catch | 562 | ARP center catch detail |
| 511 | Divider slot | 564 | ARP side catch detail |
| 512 | ARP air slots | 566 | Bury bucket |
| 514 | ARP wings | 567 | Bury bucket retention pins |
| 516 | ARP base | 572 | Basin tray |
| 518 | ARP punch base | 574 | Gardener top cover |
| 520 | ARP-column head | 576 | Carry handle |
| 522 | ARP-column head opening | 578 | Hanger |
| 524 | ARP-column locking tabs | 579 | Tomato trellis |
| 526 | Manual ARP cutting tool | 580 | Hanger trellis |
| 528 | Cutter handle | 582 | Basin filling funnel |
| 530 | ARP cutter cutting edge | 584 | Water toy |
| 532 | ARP extraction barbs | 586 | Water toy seating rim |
| 534 | ARP vacuum attachment | 588 | Water toy base |
| 536 | Universal vacuum adapter | 590 | Water toy base legs |
| 538 | Vacuum attachment adapter | 594 | Tower bolt holes |
| 540 | Vacuum attachment head | 596 | Toy base reinforcing ribs |
| 542 | Screen housing | 598 | Building tray |
| 544 | Vacuum screen | 600 | Tray drainage hole |
| 546 | Vacuum collector | 604 | Bolt holes |
| 548 | Vacuum neck | 607 | 6.50 mm holes |
| 550 | Vacuum cutting nozzle | 608 | 6.500 mm wells |
| 554 | Vacuum hose to vacuum | 609 | 2.00 mm drain holes |
| 556 | Wall divider catch | 610 | Relief stud pattern |
| 558 | Reversible center catch | 612 | Tower |
| 632 | Water tank bleeder knob | 614 | Tower legs |
| 634 | Valve cover | 616 | Tower bracing |
| 636 | Valve assembly | 618 | Tower bolt holes-feet |
| 638 | Diffuser | 619 | Tower bolts |
| 640 | Lever | 620 | Tower platform |
| 644 | Pilot valve member | 622 | Tower platform tank seating rim |
| 646 | Diaphragm | | |
| 650 | Insert member | 624 | Water/pressure tank |
| 654 | Elastomeric body | 626 | Water tank output valve |
| 656 | Outer ring | 628 | Water tank inlet valve |
| 658 | Perforated disc member | 630 | Water tank air supply valve |
| 660 | Valve body | | |
| 664 | Fastening screw | | |
| 666 | Outlet nipple | | |

We claim:

1. In a self-watering system comprising an open top water holding basin having a bottom and a side wall and adapted for receiving from a source thereof and holding therein a desired volume of water; a water using attachment adapted for mounting on top of the basin; mounting and locking means for mounting and locking the water using attachment on the basin; means comprising a water conduit for transporting water from a source thereof to the basin; means comprising a fill valve for filling the basin with water to a selected water level line which leaves air space above the surface of the water when the basin is filled with a volume of water to the selected water level line; and water transfer means for transferring water from the basin to the water using attachment when the latter is mounted on the former; the improvement wherein:
  (a) the water holding basin comprises:
    (i) an axially positioned port in the bottom thereof providing access into the basin for water transported to the basin from the source thereof by the water conduit;
    (ii) seating means on the interior surface of the bottom thereof for axially positioning and water tight securing and mounting the fill valve onto the interior surface of the bottom of the basin over the port in the basin;
  (b) the fill valve is an adjustable diaphragm fill valve which is either water tight mounted or adapted to be water tight mounted on the seating means on the interior surface of the bottom of the basin and is adapted for maintaining the volume of water in the basin at the selected water level line which is above the top of the fill valve when mounted on the basin, which diaphragm valve comprises:
    (i) a water inlet port adapted for water tight connection through the port in the bottom of the basin to the water conduit and for receiving water from a source thereof under pressure;
    (ii) a water outlet port for dispensing into the basin water received from the inlet port thereof; and
    (iii) a gas port for maintaining the diaphragm of the fill valve at ambient pressure when accessed to ambient air;

(c) the water conduit projects substantially radially outwardly from the port in the bottom of the basin beyond the side wall of the basin and above the lower edge thereof and is adapted to be connected to a source of water under pressure; and (d) the diaphragm fill valve is connected to a gas conduit for accessing the diaphragm fill valve to ambient air.

2. The system of claim 1 which comprises first positioning means for guiding the water conduit in a path proximate the exterior surface of the bottom of the basin.

3. The system of claim 1 which comprises second positioning means for guiding the gas conduit in a path proximate the exterior surface of the bottom of the basin.

4. The system of claim 1 which comprises a seating rim at the top of the basin which is adapted for mounting the water using attachment on the top of the basin, which seating rim comprises a plurality of spaced slots adapted for use as latch ports for locking the water using attachment on the open top of the basin.

5. A method of maintaining a constant volume of water in an animal waterer by adding water thereto automatically at a rate determined by the water consumed therefrom, which comprises the steps of mounting the liner as defined in claim 4 onto the basin of the system defined therein and connecting the conduit to a source of water under pressure.

6. The system of claim 1 which comprises, as the water using attachment, a garden planter or terrarium, a device for dispensing water underground to the roots of a growing plant, an animal waterer, a bird bath, a hummingbird feeder, an amphibian habitat, an animal or bird cage or a water toy.

7. The system of claim 1 which comprises, as the water using attachment, an animal waterer in the form of a liner having a shape complementing the interior shape of the basin so that the liner can be positioned below the selected water level of the basin and having openings therethrough to permit water in the basin to pass through the liner and form a pool of water from which an animal can drink.

8. The system of claim 7, wherein the animal waterer comprises a tray for containing animal food, which tray is separate from the portion of the animal waterer which contains water and has an area defined by a rim which is substantially less than the area of the open top of the basin.

9. The system of claim 8, wherein the tray includes a shield disposed along the side thereof defining a partition between it and the animal waterer portion which acts as a barrier for the food and the water.

10. The system of claim 8, which comprises a bulk food dispensing mechanism for dispensing dry food to the tray.

11. The system of claim 1 which comprises, as the water using attachment, a bird bath in the form of a liner having a shape complementing the interior shape of the basin so that the liner can be positioned below the selected water level line of the basin and having openings therethrough to permit water in the basin to pass through the liner and form a pool of water in which a bird can bathe.

12. The system of claim 1, wherein the water using attachment is at least one plant pot having an opening in the bottom thereof, which system comprises a platform adapted for dismountably mounting on the basin, above the selected water level line, and for supporting the plant pot and having a plurality of holes therethrough, each of which is adapted for receiving a wick extending from an opening in the bottom of the pot into the basin for wicking water therefrom into the pot when the basin is filled with water to the selected water level line and the pot contains planting medium.

13. The system of claim 12, wherein the wick is in the shape of a semi-rigid rod and is formed from dehydrated and compressed natural or synthetic fibers which are wrapped in an expandable water permeable membrane and, at the middle portion thereof, also by a non-expanding impermeable membrane which surrounds the permeable membrane, whereby the wick when saturated with water expands only at the top and bottom portions thereof.

14. The system of claim 12, wherein the wick has a slidably removable plastic sleeve which has a domed top and which has multiple narrow slits radiating from the center of the domed top, whereby after insertion into soil or other water-absorbing media, the cap can manually be slipped down past the wick tip and off the opposite end of the wick, thereby freeing the wick to expand and to wick water from the basin to the water using attachment.

15. The system of claim 12, wherein the wick is capped by a rigid water soluble domed topped sleeve which has one or more holes in the domed top thereof, whereby after insertion in soil or other water-absorbing media water wicked thereto from the basin dissolves the sleeve, thereby permitting the wick to expand and wick water to the water using attachment.

16. The system of claim 1, wherein the water using attachment is an underground water spring device adapted for watering the roots of a growing plant when the basin and water using attachment positioned thereon is planted below the roots of the growing plant and which comprises a plate mountable on the top of the basin which acts as a barrier for the roots and is fitted with a plurality of wicks extending downwardly into the water-containing portion of the basin for wicking water in the basin to the roots of the growing plant.

17. The system of claim 16, wherein the underground water spring device is fed water by a conduit extending from the basin to the source of pressurized water and wherein the diaphragm valve mounted in the basin is connected by a conduit to above ground ambient air.

18. The system according to claim 1 wherein the water conduit which is adapted to be connected to the water inlet port of the fill valve for transporting water from a source of water under pressure to the fill valve is positioned above the bottom edge of the side wall of the basin.

19. The system according to claim 1 in assembled condition with the diaphragm fill valve mounted on the basin.

20. A method of providing a constant volume of water automatically to a water using attachment at a rate determined by the water demand of the water using attachment, which comprises the steps of mounting the water using attachment on the basin of a system of claim 1 and connecting the conduit to a source of water under pressure.

21. A method of claim 20, wherein the water using attachment is an animal waterer.

* * * * *